(12) United States Patent
Kim et al.

(10) Patent No.: US 12,212,444 B2
(45) Date of Patent: Jan. 28, 2025

(54) METHOD FOR TRANSMITTING/RECEIVING A-PPDU IN WIRELESS LAN SYSTEM AND DEVICE THEREFOR

(71) Applicant: LG ELECTRONICS INC., Seoul (KR)

(72) Inventors: Jinmin Kim, Seoul (KR); Kyuin Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 325 days.

(21) Appl. No.: 17/640,243

(22) PCT Filed: Mar. 31, 2020

(86) PCT No.: PCT/KR2020/004409
§ 371 (c)(1),
(2) Date: Mar. 3, 2022

(87) PCT Pub. No.: WO2021/045341
PCT Pub. Date: Mar. 11, 2021

(65) Prior Publication Data
US 2022/0353123 A1    Nov. 3, 2022

(30) Foreign Application Priority Data
Sep. 3, 2019   (KR) .................. 10-2019-0109181

(51) Int. Cl.
*H04L 1/00* (2006.01)
*H04L 27/26* (2006.01)
*H04W 84/12* (2009.01)

(52) U.S. Cl.
CPC ........ *H04L 27/2613* (2013.01); *H04L 1/0008* (2013.01); *H04L 27/2603* (2021.01); *H04L 27/2605* (2013.01); *H04W 84/12* (2013.01)

(58) Field of Classification Search
CPC .................. H04L 1/0008; H04L 27/01; H04L 27/2602; H04L 27/2603; H04L 27/2605; H04L 27/2613; H04L 27/2636; H04W 84/12
See application file for complete search history.

(56) References Cited

U.S. PATENT DOCUMENTS

2017/0134928 A1    5/2017  Eitan et al.
2017/0201395 A1    7/2017  Jia et al.
(Continued)

FOREIGN PATENT DOCUMENTS

WO     2019005653     1/2019

OTHER PUBLICATIONS

Text changes on EDMG A-PPDU format; doc.: IEEE 802.11-17/1677r1; Nov. 2017 (Year: 2017).*

(Continued)

*Primary Examiner* — Melvin C Marcelo
*Assistant Examiner* — Natali Pascual Peguero
(74) *Attorney, Agent, or Firm* — LEE, HONG, DEGERMAN, KANG & WAIMEY

(57) ABSTRACT

A method and a device for transmitting an A-PPDU in a wireless LAN system are proposed. Specifically, a transmission STA generates an A-PPDU and transmits the A-PPDU to a reception STA. A first PPDU and a second PPDU are aggregated into the A-PPDU. The first PPDU includes an L-Header field, a first EDMG-Header field, and a first data field. The second PPDU includes a second EDMG-Header field and a second data field. Zero padding is inserted in the first data field on the basis of the minimum number of symbol blocks of the first PPDU.

11 Claims, 45 Drawing Sheets

(56) References Cited

U.S. PATENT DOCUMENTS

2018/0367650 A1 12/2018 Motozuka et al.
2020/0252156 A1* 8/2020 Lomayev .............. H04L 1/0041

OTHER PUBLICATIONS

Sakamoto, et al., "Text changes on EDMG A-PPDU Format", doc.: IEEE 802.11-17/1677r1, Nov. 2017, 6 pages.
PCT International Application No. PCT/KR2020/004409, International Search Report dated Jul. 8, 2020, 4 pages.

* cited by examiner

FIG. 9

| CH 1 | L-STF | L-CE | L-Header | ay Header A | ay STF | ay CE | ay Header B | ay payload |
|---|---|---|---|---|---|---|---|---|
| | GF-STF | GF-CE | | | | | | |
| CH 2 | L-STF | L-CE | L-Header | ay Header A | | | | |

(L: Legacy, GF: Gap Filling, ay: 802.11ay)

(a)

(b)

METHOD FOR TRANSMITTING/RECEIVING A-PPDU IN WIRELESS LAN SYSTEM AND DEVICE THEREFOR

CROSS-REFERENCE TO RELATED APPLICATIONS

This application is the National Stage filing under 35 U.S.C. 371 of International Application No. PCT/KR2020/004409, filed on Mar. 31, 2020, which claims the benefit of earlier filing date and right of priority to Korean Application No. 10-2019-0109181, filed on Sep. 3, 2019, the contents of which are all incorporated by reference herein in their entirety.

BACKGROUND OF THE DISCLOSURE

Field of the Disclosure

The present disclosure relates to a method for transmitting/receiving an A-PPDU in a wireless local area network (WLAN) system and, most particularly, to a method and apparatus for transmitting/receiving an A-PPDU based on a guard interval (GI).

Related Art

A standard for the wireless LAN technology is being developed as an Institute of Electrical and Electronics Engineers (IEEE) 802.11 standard. IEEE 802.11a and b use an unlicensed band in 2.4. GHz or 5 GHz. And, IEEE 802.11b provides a transmission rate of 11 Mbps, and IEEE 802.11a provides a transmission rate of 54 Mbps. And, IEEE 802.11g provides a transmission rate of 54 Mbps by applying orthogonal frequency-division multiplexing (OFDM). IEEE 802.11n provides a transmission rate of 300 Mbps on 4 spatial streams by applying multiple input multiple output-OFDM (MIMO-OFDM). The IEEE 802.11n supports a channel bandwidth of up to 40 MHz, and, in this case, the IEEE 802.11n provides a transmission rate of 600 Mbps.

The above-described wireless LAN (WLAN) standard was previously defined as the IEEE 802.11ac standard, which uses a maximum bandwidth of 160 MHz, supports 8 spatial streams, and supports a maximum rate of 1 Gbit/s. And, discussions are now being made on the IEEE 802.11ax standardization.

Meanwhile, the IEEE 802.11ad system regulates a capability enhancement for an ultra-high speed throughput in a 60 GHz band, and, for the first time, in the above-described IEEE 802.11ad system, discussions are being made on an IEEE 802.11ay for adopting channel bonding and MIMO techniques.

SUMMARY OF THE DISCLOSURE

Technical Objects

The present disclosure proposes a method and apparatus for transmitting/receiving an A-PPDU in a WLAN system.

Technical Solutions

The present disclosure proposes a method and apparatus for transmitting/receiving an A-PPDU.

The present embodiment proposes a method of ensuring a minimum number of symbol blocks in an A-PPDU of an 802.11ay system and generating an A-PPDU. This is because, when a GI of a legacy part (non-EDMG portion) and a GI of an EDMG part (EDMG portion) are different, since an FFT window of a receiver becomes different, there lies a problem in that FDE cannot be performed. The present embodiment proposes a method for resolving the above-described problem.

Firstly, the terms will be described as follows. An A-PPDU may correspond to an Enhanced Directional Multi-Gigabit (EDMG) PPDU, which is defined in the 802.11 ay system. The transmitting STA may be an access point (AP) or a wireless audio/video (AV) apparatus (or device). The receiving STA may be a station (STA) or a wireless audio/video (AV) apparatus (or device). The wireless AV apparatus may be a main body device (set-top box, display device (TV), a remote controller device (remote).

The transmitting station (STA) generates an Aggregated-Physical Protocol Data Unit (A-PPDU).

The transmitting STA transmits the A-PPDU to a receiving STA.

The A-PPDU is an aggregation of a first PPDU and a second PPDU. The A-PPDU is generated by aggregating n number of EDMG PPDUs. And, although the present embodiment describes a case where n=2, the present disclosure will not always be limited to this.

The first PPDU includes a Legacy (L)-Header field, a first Enhanced Directional Multi-Gigabit (EDMG)-Header field, and a first data field.

The second PPFU includes a second EDMG-Header field and a second data field.

A GI may be inserted at both ends of the first and second data fields. Types of the GI may include a short GI, a normal GI, and a long GI.

The short GI may be generated based on a golay sequence having a length of 32. The normal GI may be generated based on a golay sequence having a length of 64. And, the long GI may be generated based on a golay sequence having a length of 128.

A GI that is inserted in the L-Header field may be generated based on a golay sequence having a length of 64. Accordingly, a length of a GI that is inserted in the L-Header field may be different from a length of a GI that is inserted in the first and second data fields. When GI lengths are different, a problem may occur in that the receiving STA cannot perform FDE due to a difference in the FFT window. The present embodiment proposes a method for resolving the above-described problems by adjusting a starting point of the FFT window of the receiving STA by extending a length of the first PPDU by adding zero padding or dummy value to the first PPDU.

Based on the minimum number of symbol blocks of the first PPDU, zero padding is inserted in the first data field.

Effects of the Disclosure

According to the embodiment that is proposed in the present disclosure, during a decoding process, a receiving STA may obtain GI type information and length information of a first PPDU by securing a minimum number of symbol blocks, thereby satisfying a cyclic property in all durations so as to perform FDE for an A-PPDU.

BRIEF DESCRIPTION OF THE DRAWINGS

FIG. 9 is a diagram showing a PPDU structure that can be applied to the present disclosure.

DESCRIPTION OF EXEMPLARY EMBODIMENTS

In the present disclosure, "A or B" may mean "only A", "only B" or "both A and B". In other words, in the present disclosure, "A or B" may be interpreted as "A and/or B". For example, in the present disclosure, "A, B or C" may mean "only A", "only B", "only C", or "any combination of A, B, and C".

A slash (/) or comma used in the present disclosure may mean "and/or". For example, "A/B" may mean "A and/or B". Accordingly, "A/B" may mean "only A", "only B", or "both A and B". For example, "A, B, C" may mean "A, B or C".

In the present disclosure, "at least one of A and B" may mean "only A", "only B", or "both A and B". In addition, in the present disclosure, the expression "at least one of A or B" or "at least one of A and/or B" may be equally interpreted as "at least one of A and B".

In addition, in the present disclosure, "at least one of A, B and C" may mean "only A", "only B", "only C", or "any combination of A, B, and C". In addition, "at least one of A, B or C" or "at least one of A, B and/or C" may mean "at least one of A, B, and C".

In addition, parentheses used in the present disclosure may mean "for example".

Technical features described individually in one drawing in the present disclosure may be individually implemented, or may be simultaneously implemented.

The following example of the present disclosure may be applied to various wireless communication systems. For example, the following example of the present disclosure may be applied to a wireless local area network (WLAN) system. For example, the present disclosure may be applied to the IEEE 802.11a/g/n/ac standard or the IEEE 802.11ax standard. Additionally, the present disclosure may also be applied to the newly proposed EHT standard or IEEE 802.11be standard. Additionally, an example of the present disclosure may be applied to the EHT standard or a new WLAN standard that is an enhanced version of IEEE 802.11be. Additionally, an example of the present disclosure may be applied to a mobile communication system. For example, it may be applied to a mobile communication system based on Long Term Evolution (LTE) based on the 3rd Generation Partnership Project (3GPP) standard and its evolution. Furthermore, an example of the present disclosure may be applied to a communication system of a 5G NR standard based on the 3GPP standard.

Hereinafter, in order to describe the technical features of the present disclosure, the technical features that are applicable to the present disclosure will be described.

1. Wireless LAN (WLAN) System

1-1. General Wireless LAN (WLAN) System

Figure 1:
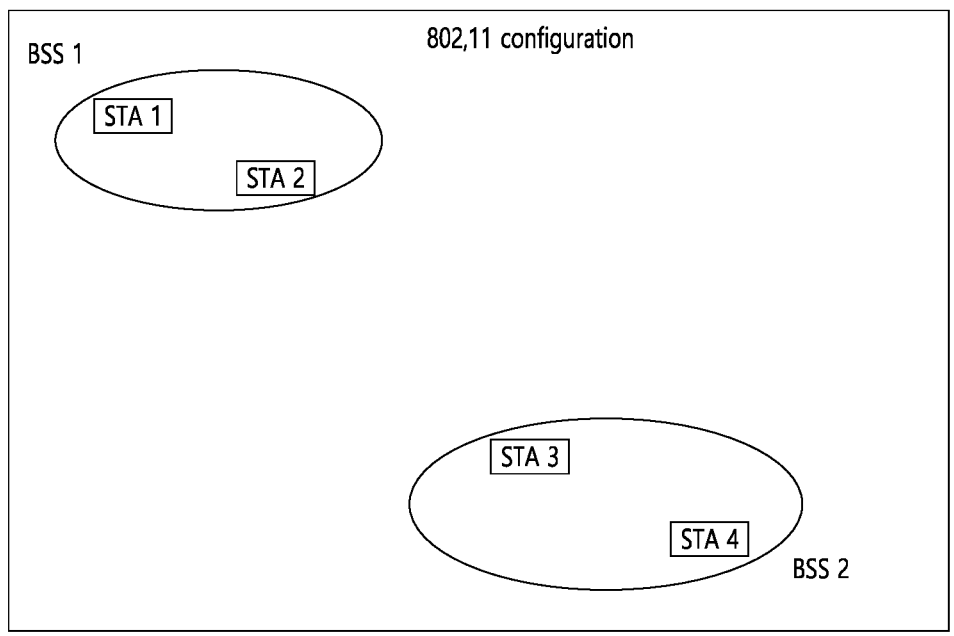
FIG. 1 is a diagram showing an exemplary configuration of a wireless LAN (WLAN) system.

FIG. 1 is a diagram showing an exemplary configuration of a wireless LAN (WLAN) system.

As shown in FIG. 1, a wireless LAN (WLAN) includes one or more Basic Service Set (BSS). A BSS is a set (or group) of stations (STAs) that successfully achieve synchronization so as to communication with one another.

As a logical entity including a Medium Access Control (MAC) and a Physical Layer interface for a wireless medium, an STA includes an access point (AP) and a non-AP Station. Among the STAs, a portable device (or terminal) that is operated by a user corresponds to a non-AP Station. And, therefore, when an entity is simply mentioned to as an STA, the STA may also refer to a non-AP Station. Herein, the non-AP Station may also be referred to as other terms, such as a terminal, a wireless transmit/receive unit (WTRU), a user equipment (UE), a mobile station (MS), a mobile terminal, a mobile subscriber unit, and so on.

Additionally, the AP is an entity providing its associated station (STA) with an access to a distribution system (DS) through a wireless medium. Herein, the AP may also be referred to as a centralized controller, a base station (B), a Node-B, a base transceiver system (BTS), a personal basic service set central point/access point (PCP/AP), a site controller, and so on.

A BSS may be categorized as an infrastructure BSS and an independent BSS (IBSS).

The BSS shown in FIG. 1 corresponds to an IBSS. The IBSS refers to a BSS that does not include an AP. And, since the BSS does not include an AP, access to the DS is not authorized (or approved), and, therefore, the IBSS functions as a self-contained network.

Figure 2:
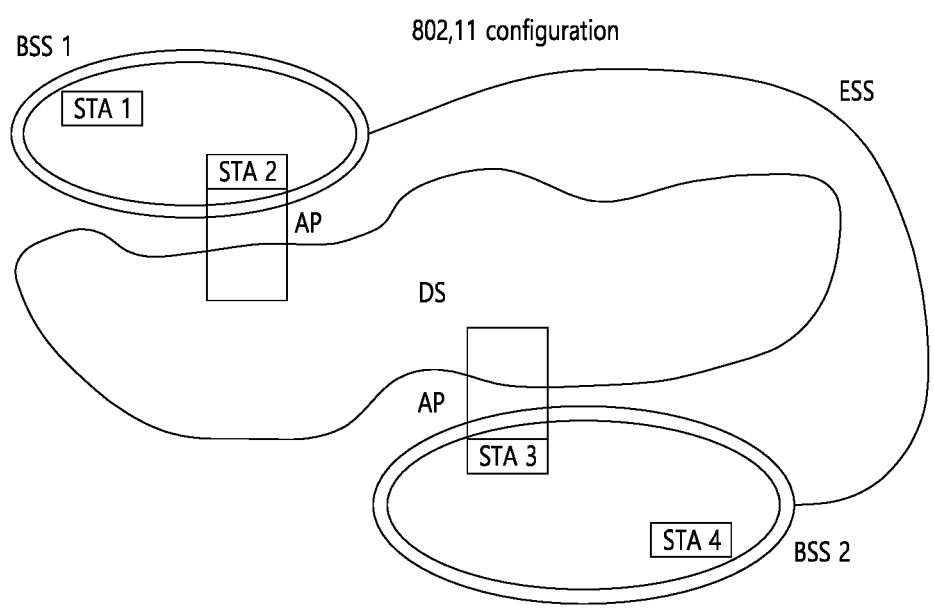
FIG. 2 is a diagram showing another exemplary configuration of a wireless LAN (WLAN) system.

FIG. 2 is a diagram showing another exemplary configuration of a wireless LAN (WLAN) system.

The BSS shown in FIG. 2 corresponds to an infrastructure BSS. The infrastructure BSS includes one or more STAs and APs. As a rule, although the communication between non-AP STAs is established by passing through the AP, in case a direct link is configured between the non-AP STAs, direct communication may also be established between the non-AP STAs.

As shown in FIG. 2, a plurality of infrastructure BSSs may be interconnected to one another through the DS. The plurality of BSSs being interconnected to one another through the DS is collectively referred to as an extended service set (ESS). The STAs being included in the ESS may perform communication between one another, and, a non-AP STA may shift (or relocate) from one BSS to another BSS within the same ESS while performing uninterrupted communication.

As a mechanism that connects the plurality of APs, the DS is not necessarily required to correspond to a network. As long as the DS is capable of providing a predetermined distribution service, there is no limitation in the structure or configuration of the DS. For example, the DS may correspond to a wireless network, such as a mesh network, or the DS may correspond to a physical structure (or entity) that connects the APs to one another.

Hereinafter, a channel bonding method that is performed in a wireless LAN system will hereinafter be described in detail based on the description presented above.

1-2. Channel Bonding in a Wireless LAN (WLAN) System

Figure 3:
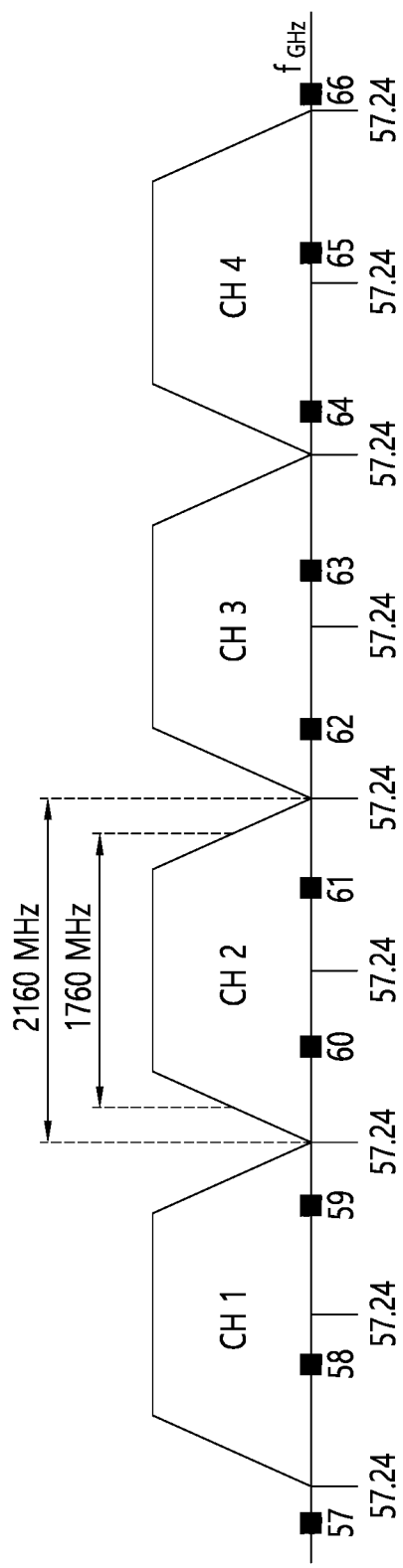
FIG. 3 is a diagram describing a channel in a 60 GHz band for describing a channel bonding operation according to an exemplary embodiment of the present disclosure.

FIG. 3 is a diagram describing a channel in a 60 GHz band for describing a channel bonding operation according to an exemplary embodiment of the present disclosure.

As shown in FIG. 3, 4 channels may be configured in a 60 GHz band, and a general channel bandwidth may be equal to 2.16 GHz. An ISM band (57 GHz-66 GHz), which is available for usage in 60 GHz, may be differently regulated in accordance with the circumstances (or situations) of each country. Generally, among the channels shown in FIG. 3, since Channel 2 is available for usage is all regions, Channel 2 may be used as a default channel. Channel 2 and Channel 3 may be used is most regions excluding Australia. And, accordingly, Channel 2 and Channel 3 may be used for channel bonding. However, it should be understood that diverse channels may be used for channel bonding. And, therefore, the present disclosure will not be limited to only one or more specific channels.

Figure 4:
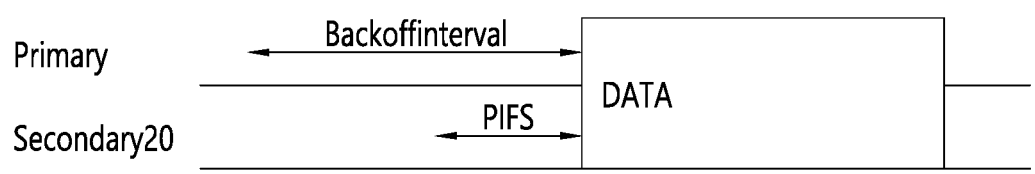
FIG. 4 is a diagram describing a basic method for performing channel bonding in a wireless LAN (WLAN) system.

FIG. 4 is a diagram describing a basic method for performing channel bonding in a wireless LAN (WLAN) system.

The example shown in FIG. 4 corresponds to an example of combining two 20 MHz channels and operating (or using) the combined channels for 40 MHz channel bonding in an IEEE 802.11n system. In case of an IEEE 802.11ac system, 40/80/160 MHz channel bonding may be performed.

The two exemplary channels of FIG. 4 include a primary channel and a secondary channel, and the STA may examine the channel status of the primary channel, among the two channels, by using a CSMA/CA method. If the primary channel is idle during a constant backoff interval, and, at a time point where the backoff count is equal to 0, if the secondary channel is idle during a predetermined period of time (e.g., PIFS), the STA may transmit data by combining the primary channel and the secondary channel.

However, in case of performing contention-based channel bonding, as shown in FIG. 4, as described above, since channel bonding can be performed only in a restricted case where the secondary channel maintains the idle state during a predetermined period of time at a time point where the backoff count for the primary channel is expired, the usage of channel bonding is very restricted (or limited). And, therefore, there lies a difficulty in that measures cannot be flexibly taken in accordance with the circumstances (or situation) of the medium.

Accordingly, in an aspect of the present disclosure, a solution (or method) for performing scheduling-based access by having the AP transmit scheduling information to the STAs is proposed. Meanwhile, in another aspect of the present disclosure, a solution (or method) for performing contention-based channel access based on the above-described scheduling or independently from the above-described scheduling is proposed. Furthermore, in yet another aspect of the present disclosure, a method for performing communication through a spatial sharing technique based on beamforming is proposed.

1-3. Beacon Interval Configuration

Figure 5:
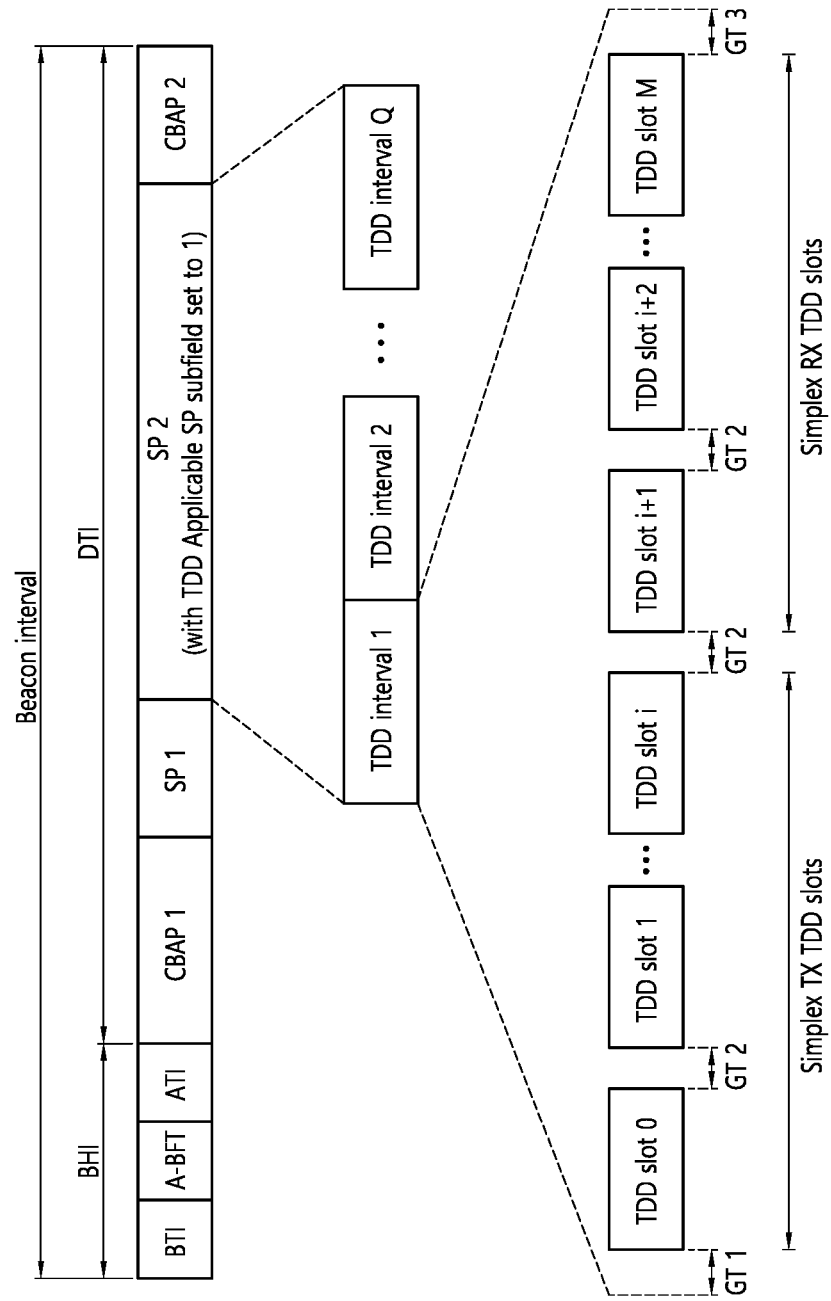
FIG. 5 is a diagram describing a configuration of a beacon interval.

FIG. 5 is a diagram describing a configuration of a beacon interval.

In an 11ad-based DMG BSS system, the time of medium may be divided into beacon intervals. A lower level period within the beacon interval may be referred to as an access period. Each of the different access periods within one beacon interval may have a different access rule. Such information on the access period may be transmitted by an AP or personal basic service set control point (PCP) to a non-AP STA or non-PCP.

As shown in the example of FIG. 5, one beacon interval may include one Beacon Header Interval (BHI) and one Data Transfer Interval (DTI). As shown in FIG. 4, the BHI may include a Beacon Transmission Interval (BTI), an Association Beamforming Training (A-BFT), and an Announcement Transmission Interval (ATI).

The BTI refers to a period (or section or duration) during which one more DMG beacon frames may be transmitted. The A-BFT refers to a period during which beamforming training is performed by an STA, which has transmitted a DMG beacon frame during a preceding BTI. The ATI refers to a request-response based management access period between PCP/AP and non-PCP/non-AP STA.

Meanwhile, the Data Transfer Interval (DTI) refers to a period during which a frame exchange is performed between the STAs. And, as shown FIG. 5, one or more Contention Based Access Periods (CBAPs) and one or more Service Periods (SPs) may be allocated (or assigned) to the DTI. Although FIG. 5 shows an example where 2 CBAPs and 2 SPs are allocated to the DCI, this is merely exemplary. And, therefore, the present disclosure is not necessarily required to be limited only to this.

FIG. 5 shows a structure of a TDD service period (SP). The TDD SP consists of one or more consecutive and adjacent TDD intervals (TDD interval 1, TDD interval 2, ..., TDD interval Q) actualized by a TDD slot structure element. The TDD interval includes one or more TDD slots. Adjacent TDD slots shown in FIG. 5 should be separated temporally by a guard time (GT) defined by the TDD slot structure element (according to FIG. 5, the slots are separated temporally by GT1, GT2, GT3). If all STA operations are identical, transmission and reception of the adjacent TDD slots allocated to the same STA pair may be continued between the adjacent TDD slots.

An STA which intends to transmit data through a beamforming operation is referred to as an initiator, and an STA which receives data transmitted from the initiator is referred to as a responder. According to FIG. 5, the initiator may transmit data (or a frame) to the responder in a TX TDD slot (TDD slot 0, TDD slot 1, ..., TDD slot i), and the responder may receive data (or a frame) from the initiator in an RX TDD slot (TDD slot i+1, TDD slot i+2, ..., TDD slot M).

Hereinafter, a physical layer configuration in a wireless LAN (WLAN) system, in which the present disclosure is to be applied, will be described in detail.

1-4. Physical Layer Configuration

It will be assumed that the wireless LAN (WLAN) system according to an exemplary embodiment of the present disclosure may provide 3 different modulations mode as shown below.

TABLE 1

| PHY | MCS | Note |
|---|---|---|
| Control PHY | 0 | |
| Single carrier PHY | 1 ... 12 | (low power SC PHY) |
| (SC PHY) | 25 ... 31 | |
| OFDM PHY | 13 ... 24 | |

Figure 6:
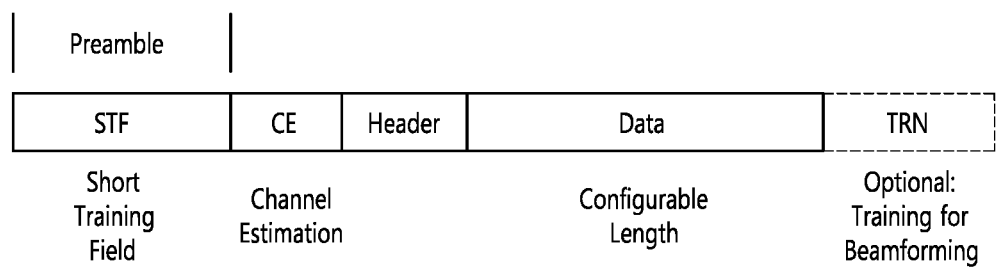
FIG. 6 is a diagram describing a physical configuration of a legacy radio frame.

Such modulation modes may be used for satisfying different requirements (e.g., high throughput or stability). Depending upon the system, among the modulation modes presented above, only some of the modulation modes may be supported. FIG. 6 is a diagram describing a physical configuration of a legacy radio frame.

It will be assumed that all Directional Multi-Gigabit (DMG) physical layers commonly include the fields that are shown below in FIG. 6. However, a regulation method of each individual field and a modulation/coding scheme used in each field may vary depending upon each mode.

As shown in FIG. 6, a preamble of a radio frame may include a Short Training Field (STF) and a Channel Estimation (CE). Additionally, the radio frame may also include a header and a data field as a payload of the radio frame and may optionally include a training (TRN) field for beamforming.

Figure 7:
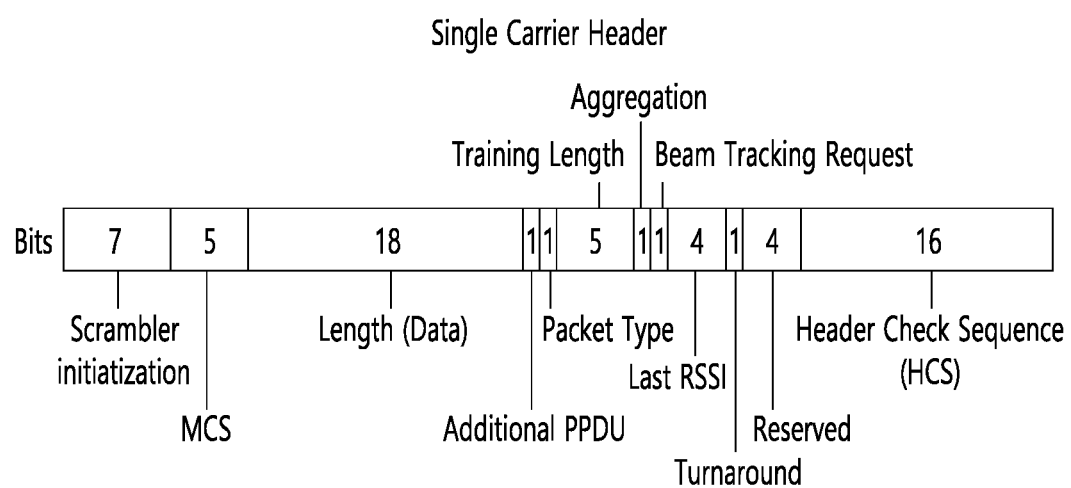
FIG. 7 and FIG. 8 are diagrams describing a configuration of a header field of the radio frame shown in FIG. 6.
Figure 8:
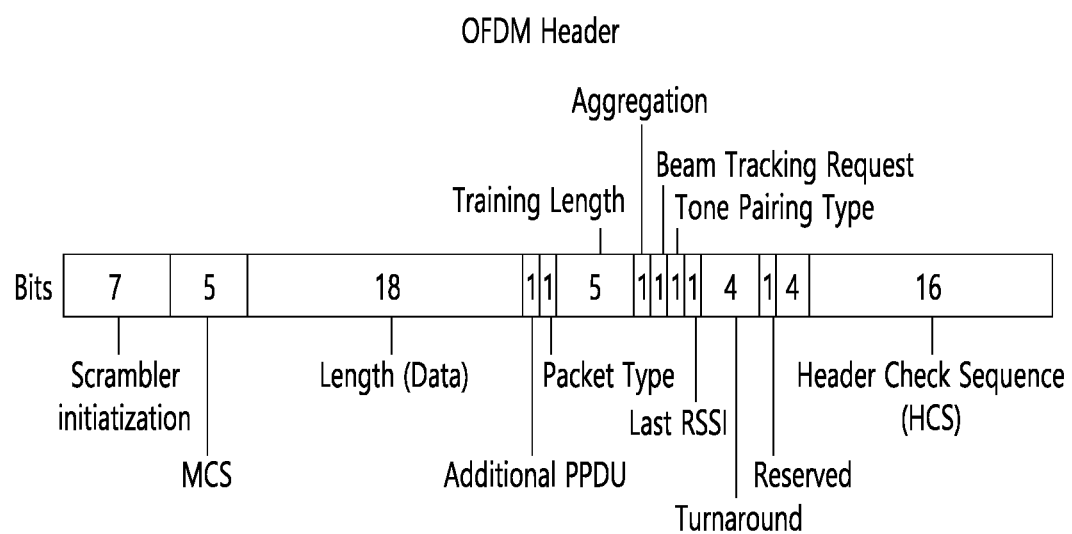

FIG. 7 and FIG. 8 are diagrams describing a configuration of a header field of the radio frame shown in FIG. 6.

More specifically, FIG. 7 illustrates a case where a Single Carrier (SC) mode is used. In the SC mode, the header may include information indicating an initial value of scrambling, information indicating a Modulation and Coding Scheme (MCS) and a data length, information indicating the presence or absence of an additional Physical Protocol Data Unit (PPDU), and information on a packet type, a training length, aggregation or non-aggregation, a presence or absence of a beam training request, a last Received Signal Strength Indicator (RSSI), truncation or non-truncation, a Header Check Sequence (HCS), and so on. Additionally, as shown in FIG. 7, the header has 4 bits of reserved bits, and, in the description presented below, such reserved bits may also be used.

Additionally, FIG. 8 illustrates a detailed configuration of a header corresponding to a case where the OFDM mode is applied. the header may include information indicating an initial value of scrambling, information indicating a MCS and a data length, information indicating the presence or absence of an additional PPDU, and information on a packet type, a training length, aggregation or non-aggregation, a presence or absence of a beam training request, a last RSSI, truncation or non-truncation, a Header Check Sequence (HCS), and so on. Additionally, as shown in FIG. 8, the header has 2 bits of reserved bits, and, just as in the case of FIG. 7, in the description presented below, such reserved bits may also be used.

As described above, the IEEE 802.11ay system considers for the first time the adoption of channel bonding the MIMO technique to the legacy 11ad system. In order to implement channel boning and MIMO, the 11ay system requires a new PPDU structure. In other words, when using the legacy 11ad PPDU structure, there are limitations in supporting the legacy user equipment (UE) and implementing channel bonding and MIMO at the same time.

For this, a new field for the 11ay UE may be defined after the legacy preamble and legacy header field for supporting the legacy UE. And, herein, channel bonding and MIMO may be supported by using the newly defined field.

FIG. 9 is a diagram showing a PPDU structure according to a preferred embodiment of the present disclosure. In FIG. 9, a horizontal axis may correspond to a time domain, and a vertical axis may correspond to a frequency domain.

When two or more channels are bonded, a frequency band having a predetermined size (e.g., a 400 MHz band) may exist between a frequency band (e.g., 1.83 GHz) that is used between each channel. In case of a Mixed mode, a legacy preamble (legacy STF, legacy CE) is duplicated through each channel. And, according to the exemplary embodiment of the present disclosure, it may be considered to perform the transmission (gap filling) of a new STF and CE field along with the legacy preamble at the same time through the 400 MHz band between each channel.

In this case, as shown in FIG. 9, the PPDU structure according to the present disclosure has a structure of transmitting ay STF, ay CE, ay Header B, and ay payload after legacy preamble, legacy header, and ay Header A via wideband. Therefore, the ay Header and ay Payload fields, which are transmitted after the Header field, may be transmitted through the channels that are used for the channel bonding. Hereinafter, in order to differentiate the ay Header from the legacy Header, the ay Header may be referred to as an enhanced directional multi-gigabit (EDMG) Header, and the corresponding terms may be used interchangeably.

For example, a total of 6 channels or 8 channels (each corresponding to 2.16 GHz) may exist in the 11ay system, and a maximum of 4 channels may be bonded and transmitted to a single STA. Accordingly, the ay header and the ay Payload may be transmitted through bandwidths of 2.16 GHz, 4.32 GHz, 6.48 GHz, and 8.64 GHz.

Alternatively, a PPDU format of a case where the legacy preamble is repeatedly transmitted without performing the above-described gap-filling may also be considered.

In this case, since the Gap-Filling is not performed, the PPDU has a format of transmitting the ay STF, ay CE, and ay Header B after the legacy preamble, legacy header, and ay Header A without the GF-STF and GF-CE fields, which are illustrated in dotted lines in FIG. 8.

Figure 10:
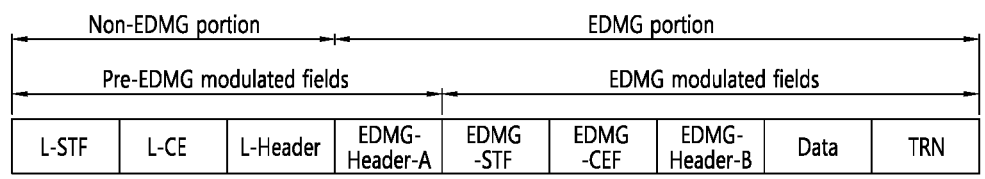
FIG. 10 is a diagram showing a simple PPDU structure that can be applied to the present disclosure.

FIG. 10 is a diagram showing a simple PPDU structure that can be applied to the present disclosure. When briefly summarizing the above-described PPDU format, the PPDU format may be illustrated as shown in FIG. 10.

As shown in FIG. 10, the PPDU format that is applicable to the 11ay system may include L-STF, L-CEF, L-Header, EDMG-Header-A, EDMG-STF, EDMG-CEF, EDMG-Header-B, Data, and TRN fields, and the above-mentioned fields may be selectively included in accordance with the format of the PPDU (e.g., SU PPDU, MU PPDU, and so on).

Herein, the part (or portion) including the L-STF, L-CEF, and L-header fields may be referred to as a Non-EDMG portion, and the remaining part (or portion) may be referred to as an EDMG portion (or region). Additionally, the L-STF, L-CEF, L-Header, and EDMG-Header-A fields may be referred to as pre-EDMG modulated fields, and the remaining fields may be referred to as EDMG modulated fields.

The (legacy) preamble may be the part of the PPDU that is used for packet detection, automatic gain control (AGC), frequency offset estimation, synchronization, indication of modulation (SC or OFDM) and channel estimation. The format of the preamble may be common to both OFDM packets and SC packets. In this case, the preamble may be composed of a short training field (STF) and a channel estimation (CE) located after the STF.

2. Beamforming Procedure that is Applicable to the Present Disclosure

As described above, methods such as channel bonding, channel aggregation, FDMA, and so on, which transmit data by using multiple channels at the same time may be applied in the 11ay system that can apply the present disclosure. Most particularly, since the 11ay system that can apply the present disclosure uses signals of a high frequency band, beamforming operation may be applied in order to transmit and/or receive signals at a high reliability level.

However, in the related art 11ad system, a beamforming method for one channel is only disclosed, and there is no implication on any beamforming method that can be applied for multiple channels. Accordingly, the present disclosure proposes a beamforming procedure that is applicable to a data transmission method being performing through multiple channels (e.g., channel bonding, channel aggregation, FDMA, and so on) according to the 11ay system.

More specifically, hereinafter a method of performing beamforming for only one channel (Section 3.1.) and a method of performing beamforming for multiple continuous or non-continuous channels (Section 3.2.), which are performed by the STA before the data transmission process in order to perform the data transmission through beamforming, will each be described in detail.

2.1. Performing Beamforming for Only One Channel

Figure 11:
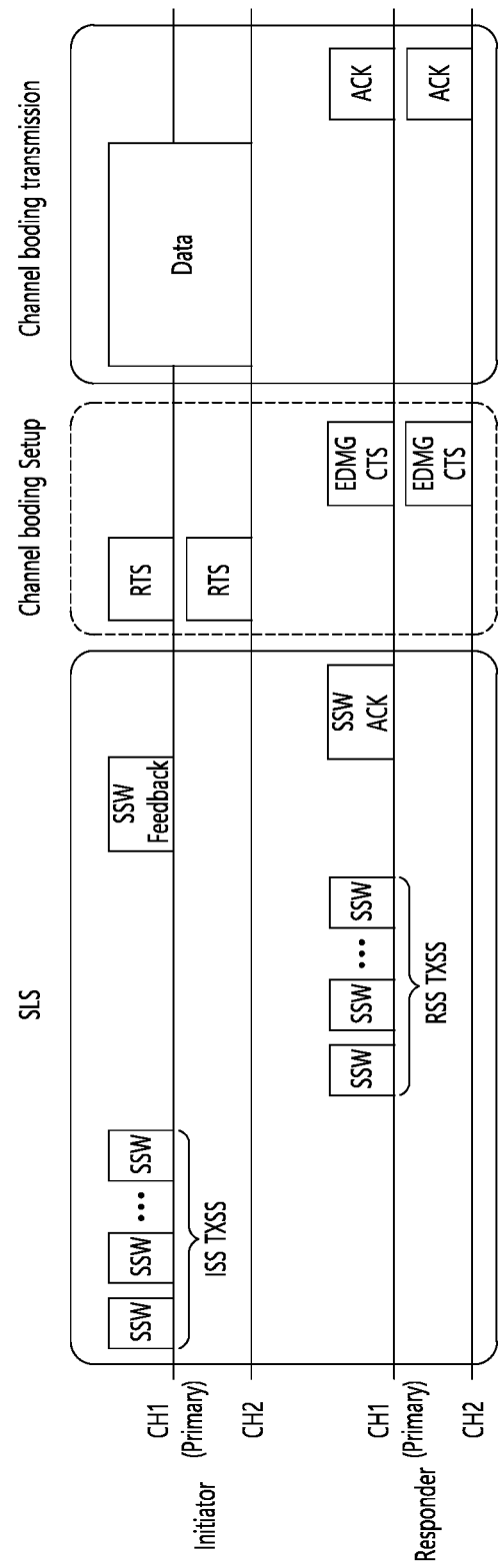
FIG. 11 is a diagram showing an operation for performing beamforming on one channel according to an exemplary embodiment of the present disclosure.

FIG. 11 is a diagram showing an operation for performing beamforming on one channel according to an exemplary embodiment of the present disclosure. Referring to FIG. 11, an STA that intends to transmit data through the beamforming operation is referred to as an initiator, and an STA that receives the data from the initiator is referred to as a responder. Also, although only a total of 2 channels (e.g., CH1, CH2) are shown in FIG. 11, the configuration of the present disclosure may also be extendedly applied to channel bonding, channel aggregation, and so on, through 3 or more channels.

As shown in FIG. 11, the beamforming procedure according to an exemplary embodiment of the present disclosure may be configured of a sector level sweep (SLS) phase, a channel bonding setup phase, and a channel bonding transmission phase. Hereinafter, the characteristics of each phase will be described in detail.

2.1.1. SLS Phase

In a 60 GHz band supporting the 11ay system, which can apply the present disclosure, in order to deliver data, control information, and so on, at a high reliability level, a directional transmission method, and not an omni transmission method, may be applied.

As a process for performing such application, the STAs that intend to transmit and/or receive data may be capable of knowing a Tx or Rx best sector for the initiator and the responder through the SLS process.

For a more detailed description of the above, configurations that are applicable to the SLS phase will hereinafter be described in detail with reference to the accompanying drawing(s).

Figure 12:
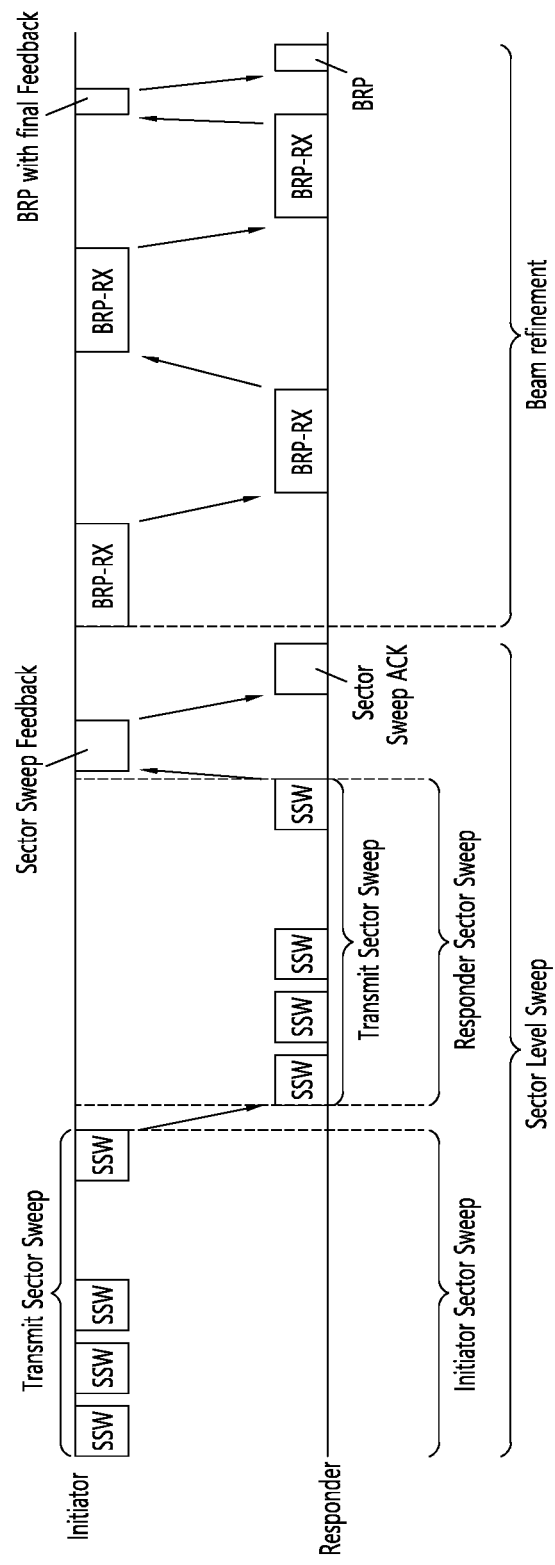
FIG. 12 shows an example of a beamforming training procedure that can be applied to the present disclosure.

FIG. 12 shows an example of a beamforming training procedure that can be applied to the present disclosure.

In a BF training that is generated during an Association BeamForming Training (A-BFT) allocation, the AP or PCP/AP becomes the initiator, and the non-AP and non-PCP/AP STA becomes the responder. In a BF training that is generated during an SP allocation, a source (EDMG) STA of the SP becomes the initiator, and a destination STA of the SP becomes the responder. In a BF training that is generated during a Transmission Opportunity (TXOP) allocation, a TXOP holder becomes the initiator, and a TXOP responder becomes the responder.

A link from the initiator to the responder is referred to as an initiator link, and a link from the responder to the initiator is referred to as a responder link.

The BF training is initiated along with the Sector Level Sweep (SLS) from the initiator. An object of the SLS phase is to allow communication to be established between two STAs in a control PHY layer or a higher MCS. Most particularly, the SLS phase provides only the transmission of the BF training.

Additionally, if a request is made by the initiator or the responder, a Beam Refinement Protocol or Beam Refinement Phase (BRP) may follow the SLS phase.

An object of the BRP phase is to enable iterative refinement of an Antenna Weight Vector (AWV) of all transmitter and receivers in all STAs. Among the STAs participating in the beam training, if one STA chooses to use only one transmission antenna pattern, reception training may be performed as part of the SLS phase.

As a more detailed description of the SLS phase, the SLS phase may include four elements listed below: an Initiator Sector Sweep (ISS) for training an initiator link, a Responder Sector Sweep (RSS) for training a responder link, a SSW feedback, and a SSW ACK.

The initiator initiates the SLS phase by transmitting the frame(s) of the ISS.

The responder does not initiate the transmission of the frame(s) of the RSS before the ISS is successfully completed. However, a case where the ISS is generated during the BTI may be an exemption.

The initiator does not initiate the SSW feedback before the RSS phase is successfully completed. However, a case where the RSS is generated within the A-BFT may be an exemption. The responder does not initiate the SSW ACK of the initiator during the A-BFT.

The responder initiates the SSW ACK of the initiator immediately after successfully completing the SSW feedback of the initiator.

During the SLS phase, the BF frame that is transmitted by the initiator may include a (EDMG) beacon frame, a SSW frame, and a SSW feedback frame. During the SLS phase, the BF frame that is transmitted by the responder may include a SSW frame and a SSW-ACK frame.

During the SLS, if each of the initiator and the responder executes the Transmit Sector Sweep (TXSS), at the end of the SLS phase, each of the initiator and the responder possesses its own transmit sector. If the ISS or RSS employs (or uses) a receive sector sweep, each of the responder or initiator possesses its own receive sector.

The STA does not change (or vary) the transmit power (or transport power) during the sector sweep.

Figure 13:
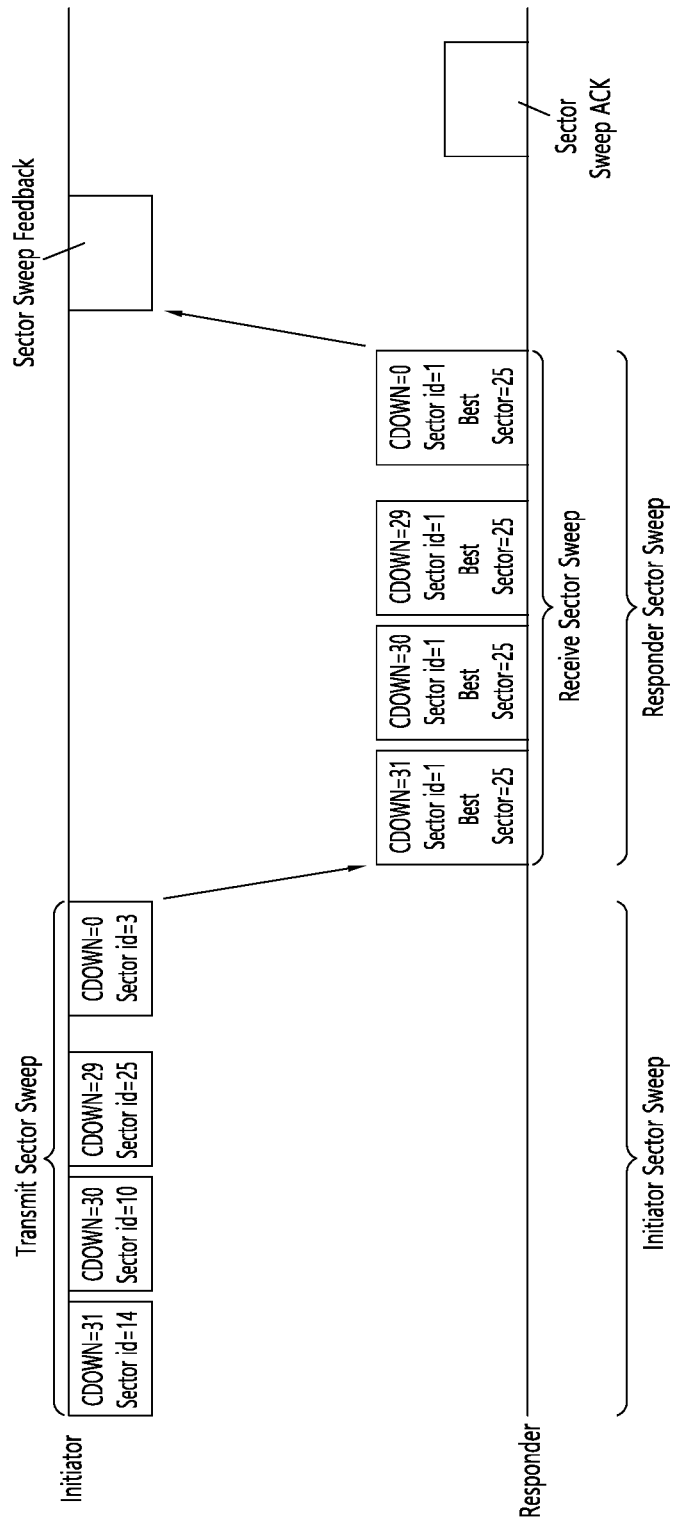
FIG. 13 and FIG. 14 is a diagram showing examples of a Sector Level Sweep (SLS) phase.
Figure 14:
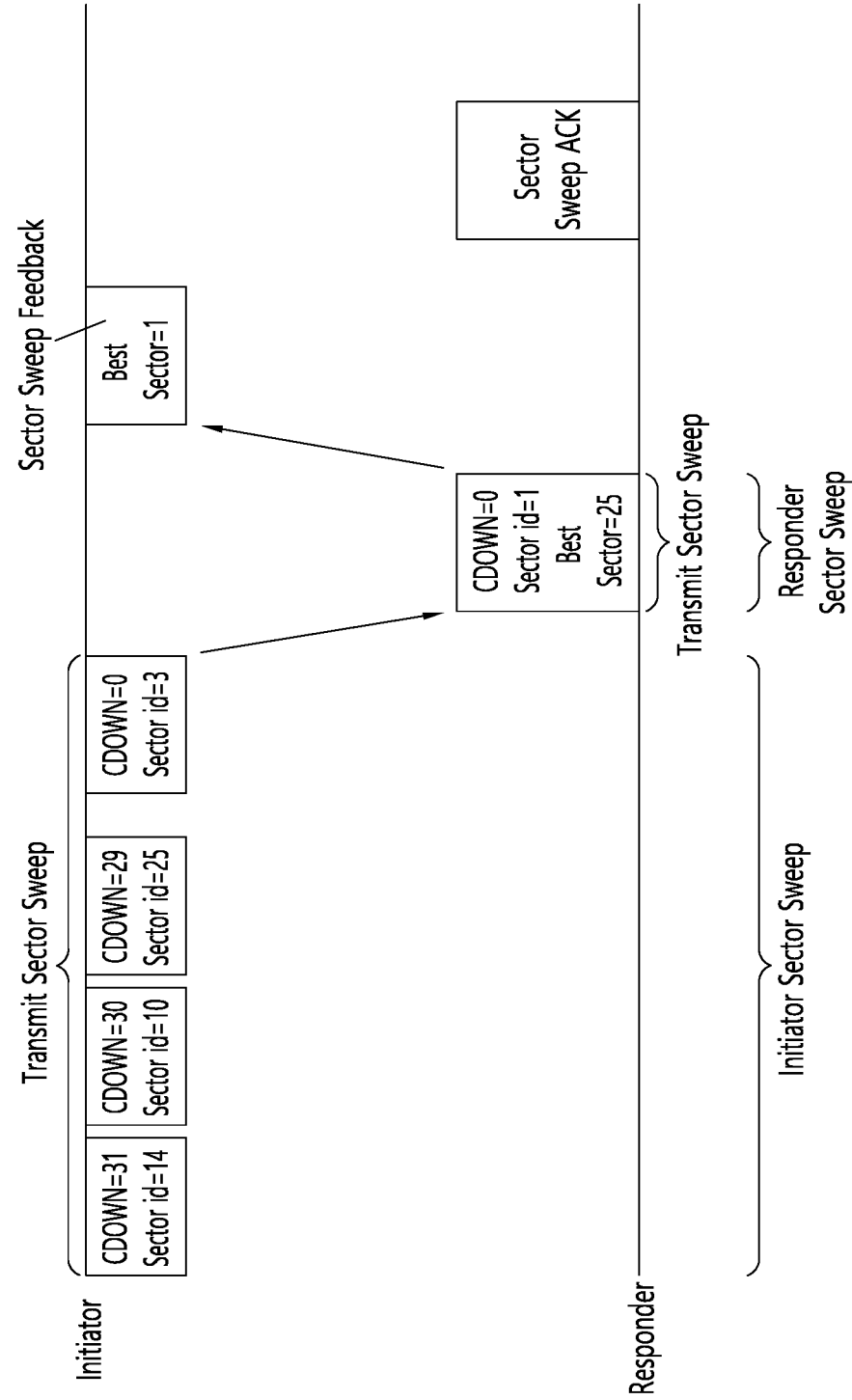

FIG. 13 and FIG. 14 is a diagram showing examples of a SLS phase.

In FIG. 13, the initiator has numerous sectors, and the responder has one transmit sector and one receive sector, which are used in the RSS. Accordingly, the responder transmits all of the responder SSW frames through the same transmit sector, and, at the same time, the initiator switches the receive antenna.

In FIG. 14, the initiator has numerous transmit sectors, and the responder has one transmit sector. In this case, the receive training for the initiator may be performed during the BRP phase.

Such SLS may be described as presented below.

As a protocol performing link detection in an 802.11ay system that can apply the present disclosure, the SLS corresponds to a beam training method, wherein network nodes consecutively transmits and/or receives frames including the same information by switching only the direction of the beam, and selecting, among the successfully received frames, a beam direction having the best index (e.g., Signal to Ratio (SNR), Received Signal Strength Indicator (RSSI), and so on) indicating the capability of the receive channel link.

Hereinafter, the BRP may be described as presented below.

As a protocol finely adjusting a beam direction that can maximize the data throughput from a beam direction, which is determined by the SLS or another means, the BRP may be performed when needed. Such BRP performs beam training by using a BRP frame, which is defined for the BRP protocol and which includes beam training information and information reporting the training results. For example, the BRP corresponds to a beam training method, wherein a BRP frame is transmitted and/or received by using a beam that is determined by a previous beam training, and wherein a beam training is actually performed by using a beam training sequence, which is included in an end part of the successfully transmitted and/or received BRP frame. The BRP is different from the SLS in that the SLS uses the frame itself for the beam training, whereas the BRP uses only a beam training sequence.

Such SLS phase may be performed during a Beacon Header Interval (BHI) and/or a Data Transfer Interval (DTI).

Firstly, the SLS phase being performed during the BHI may be the same as the SLS phase, which is defined in the 11ad system for its co-existence with the 11ad system.

Subsequently, the SLS phase, which is performed while the DTI is being performed, may be performed in case a beamforming training is not performed between the initiator and the responder, or in case a beamforming (BF) link is lost. At this point, if the initiator and the responder correspond to the 11ay STA, the initiator and the responder may transmit a short SSW frame instead of the SSW frame for the SLS phase.

Herein, the short SSW frame may be defined as a frame including a short SSW packet within a data field of a DMG control PHY or DMG control mode PPDU. At this point, a detailed format of the short SSW packet may be differently configured in accordance with the purpose (e.g., I-TXSS, R-TXSS, and so on) for which the short SSW packet is being transmitted.

The characteristics of the above-described SLS phase may also be applied to all of the SLS phases that will hereinafter be described.

2.1.2. Channel Bonding Setup Phase

Referring to FIG. 11, the STAs (e.g., initiator, responder, and so on) that intend to perform data communication in the above-described phase may transmit and/or receiving control information for channel bonding, channel aggregation, FDMA transmission, and so on, while sending and receiving an RTS (setup frame) and a DMG CTS (feedback frame) to and from one another. At this point, information for the transmission method using multiple channels, such as channel bonding, channel aggregation, FDMA transmission, and so on, wherein the information includes channel information, channel bandwidth, and so on, may be applied as the information being transmitted and received to and from one another.

In this exemplary embodiment, beamforming training for one channel (e.g., primary channel) has already been performed through the above-described SLS phase, and, accordingly, the initiator and the responder may assume that it is possible to equally apply the beamforming result (e.g., direction of the best sector) for the one channel to other channels as well. Accordingly, when the initiator and responder transmit the RTS and DMG CTS through multiple channels, the RTS and DMG CTS may be transmitted by applying the best sector direction, which is decided earlier through the SLS phase, as described above, to all of the channels.

2.1.3. Channel Bonding Transmission Phase

As shown in FIG. 11, after receiving the DMG CTS, which corresponds to the response to the transmitted RTS, the initiator may transmit actual data through multiple idle channels by using information formation on the channel that is negotiated with the responder, and other information, such as channel bandwidth, and so on.

More specifically, the initiator may transmit and/or receive the RTS and DMG CTS through the above-described channel bonding setup phase and may transmit and/or receive information on the actual channel to which the channel bonding (or channel aggregation) method is to be applied.

For example, although it is not shown in FIG. 11, even though the initiator has transmitted the RTS through a total of 4 channels, the initiator may receive DMG CTS for only 2 channels from the responder. This is because the responder has determined that the remaining 2 channels are currently in a busy state or in a state of being not available for usage.

By using the above-described method, the initiator and the responder may acquire information on the channel that can actually be used for the data transmitted, and the initiator may transmit data through channels that can actually be used.

At this point, since the initiator and the responder have already performed the beamforming training for only one channel (e.g., primary channel), the initiator and the responder may transmit and/or receive data signals by applying the beamforming training result (e.g., best sector direction), which was acquired from the one channel, to all channels.

Although FIG. 11 only shows the operation performed by the initiator for transmitting data by using channel bonding, the initiator may also transmit data by using the channel aggregation method.

In response to this, the responder may transmit an ACK frame through the same channel that was used by the initiator for transmitting the data. At this point, the ACK frame may be duplicated and transmitted through each channel, which was used for transmitting the data, or the ACK frame may be transmitted after performing channel bonding.

3. SU PPDU Transmission and SU A-PPDU Transmission

In 11ay, a transmitting STA may transmit and receive a PPDU using multiple channels by transmitting to multiple streams or using channel bonding or channel aggregation. However, when NSTS is 1, and when NCB is 2.16 GHz or 2.16+2.16 GHz, an EDMG-STF and an EDMG-LTF are not transmitted as described below, and a PSDU (data) is transmitted immediately after an EDMG-Header. A detailed description of Guard Interval (GI) types is as follows.

A GI is defined as three types (short GI, normal GI, long GI). An EDMG STA should support a normal GI for each combination of a channel bandwidth and a number of spatial streams being supported by an EDMG STA. All GI sequences are defined in an $N_C B \times Fc$ sampling rate. At this point, $N_C B$ is a number of integers of a 2.16 GHz channel that configures a channel bandwidth.

GI may be referred to as $GP^{iSTS}_N$ and $GIe^{iSTS}_N$. $i_{STS}$ is a number of space-time streams, and N is a sequence length. GI may be defined by using $GP^{iSTS}_{64}$ and $GIe^{iSTS}_N$. $GP^{iSTS}_{64}$ is equal to $+Ga^{iSTS}_{64}$ in all cases. $Ga^{iSTS}_{64}$ is a Golay sequence having a length of 64. However, $GIe^{iSTS}_N$ is defined in accordance with an $N_{CB}$ value. When $N_{CB}$ is equal to 1, GIe may be defined as shown below.

TABLE 2

| Space-time stream number ($i_{STS}$) | Short GI | Normal GI | Long GI |
| --- | --- | --- | --- |
| 1 | $GIe^1_{32} = -Gc^1_{32}$ | $GIe^1_{64} = +Ga^1_{64}$ | $GIe^1_{128} = -Gc^1_{128}$ |
| 2 | $GIe^2_{32} = -Gc^2_{32}$ | $GIe^2_{64} = +Ga^2_{64}$ | $GIe^2_{128} = -Gc^2_{128}$ |
| 3 | $GIe^3_{32} = -Gc^3_{32}$ | $GIe^3_{64} = +Ga^3_{64}$ | $GIe^3_{128} = -Gc^3_{128}$ |
| 4 | $GIe^4_{32} = -Gc^4_{32}$ | $GIe^4_{64} = +Ga^4_{64}$ | $GIe^4_{128} = -Gc^4_{128}$ |
| 5 | $GIe^5_{32} = -Gc^5_{32}$ | $GIe^5_{64} = +Ga^5_{64}$ | $GIe^5_{128} = -Gc^5_{128}$ |
| 6 | $GIe^6_{32} = -Gc^6_{32}$ | $GIe^6_{64} = +Ga^6_{64}$ | $GIe^6_{128} = -Gc^6_{128}$ |
| 7 | $GIe^7_{32} = -Gc^7_{32}$ | $GIe^7_{64} = +Ga^7_{64}$ | $GIe^7_{128} = -Gc^7_{128}$ |
| 8 | $GIe^8_{32} = -Gc^8_{32}$ | $GIe^8_{64} = +Ga^8_{64}$ | $GIe^8_{128} = -Gc^8_{128}$ |

Symbol blocking and GI structure for each type of EDMG SC mode PPDU are defined as follows. The GI that is used for defining a symbol blocking structure for a pre-EDMG modulated field, an EDMG-Header-B, and a Data field has been described above.

3-1. SU PPDU Transmission

The transmission of an SU PPDU, which is transmitted through a 2.16 GHz or 2.16+2.16 GHz channel, together with a single space-time stream ($N_{STS}=1$) should be defined in Fc, which is an SC chip rate. This type of PPDU does not include EDMG-STF and EDMG-CEF fields, and a symbol blocking structure for a data field continues in a symbol blocking structure of a pre-EDMG modulated field.

Figure 15:
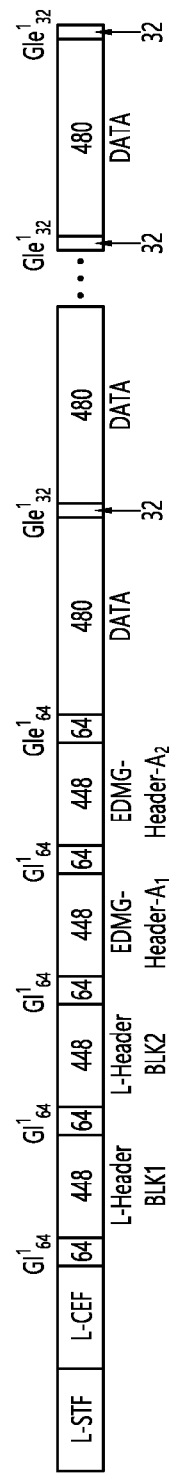
FIG. 15 is an example of an SU PPDU structure for a short GI at a 2.16 GHz or 2.16+2.16 GHz channel.
Figure 16:
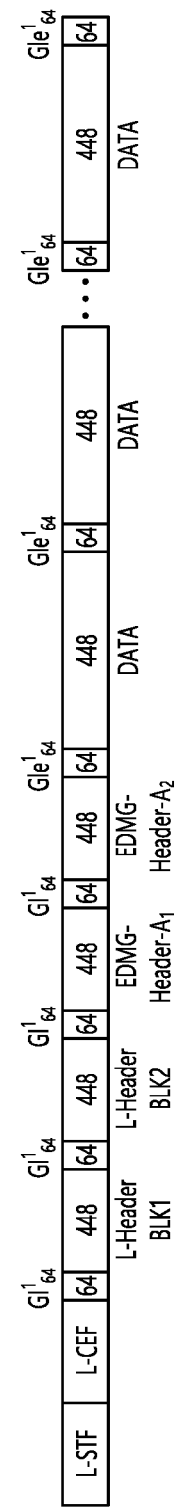
FIG. 16 is an example of an SU PPDU structure for a normal GI at a 2.16 GHz or 2.16+2.16 GHz channel.
Figure 17:
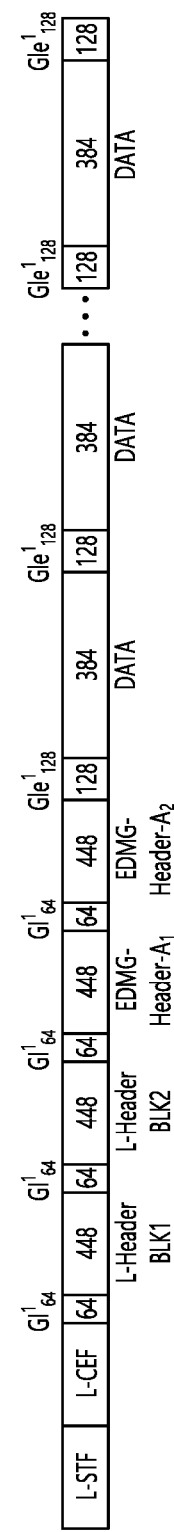
FIG. 17 is an example of an SU PPDU structure for a long GI at a 2.16 GHz or 2.16+2.16 GHz channel.

EDMG SC mode SU PPDU symbol blocking structures for short, normal, and long GIs are each shown in FIG. 15 to FIG. 17. An EDMG STA should support an SU PPDU structure together with a normal GI, which is shown in FIG. 16.

FIG. 15 is an example of an SU PPDU structure for a short GI at a 2.16 GHz or 2.16+2.16 GHz channel.

Referring to FIG. 15, the GI that is appended to the Data field is $GIe^1_{32}$, which indicates that the GI is a short GI, wherein $N_{STS}=1$.

FIG. 16 is an example of an SU PPDU structure for a normal GI at a 2.16 GHz or 2.16+2.16 GHz channel.

Referring to FIG. 16, the GI that is appended to the Data field is $GIe^1_{64}$, which indicates that the GI is a normal GI, wherein $N_{STS}=1$.

FIG. 17 is an example of an SU PPDU structure for a long GI at a 2.16 GHz or 2.16+2.16 GHz channel.

Referring to FIG. 17, the GI that is appended to the Data field is $GIe^1_{128}$, which indicates that the GI is a long GI, wherein $N_{STS}=1$.

3-2. SU A-PPDU Transmission

Meanwhile, when different data are required to be transmitted by configuring different MCS in accordance with transmission requirements or reliability requirements, instead of transmitting the data through different PPDUs, the data may be transmitted by using an aggregated (A)-PPDU, which transmits data by aggregating PPDUs. A format of an A-PPDU is as described below in FIG. 18.

Figure 18:
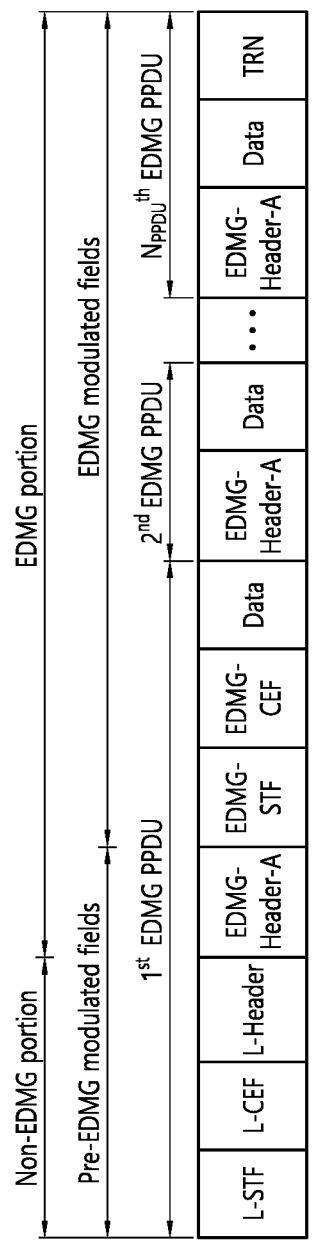
FIG. 18 shows an example of an EDMG A-PPDU format.

FIG. 18 shows an example of an EDMG A-PPDU format.

An EDMG A-PPDU is defined by a connection of EDMG PPDUs that are defined in FIG. 10. The EDMG A-PPDU should be transmitted to a single user and should not be transmitted to multiple users. FIG. 18 shows an EDMG A-PPDU format and all possible (or available) fields. A first PPDU of the EDMG A-PPDU includes L-STF, L-CEF, L-Header, EDMG-Header-A, EDMG-STF, EDMG-CEF, and Data fields, and each of the subsequent (or following) PPDUs includes only EDMG-Header-A and data fields. When a TRN field is present, the field is included only once at an end of the EDMG A-PPDU. Not all fields are transmitted to the EDMG A-PPDU. Fields are included in accordance with $N_{CB}$ and $N_{STS}$ values. An EDMG-Header-A field that is positioned before the data field defines parameters of a PSDU that is transmitted from the data field.

Most particularly, a method for configuring a PPDU according to GI lengths of subsequent PPDUs including a second PPDU within the A-PPDU is as described below.

An SU PPDU structure for the EDMG A-PPDU transmission that is described in the present embodiment covers all combinations of a channel bandwidth and a number of spatial streams.

Figure 19:
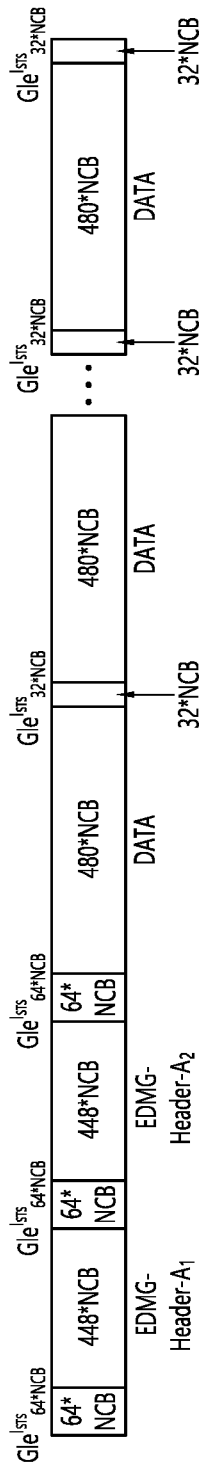
FIG. 19 is an example of an SU PPDU structure ($2 \leq i_{PPDU} \leq N_{PPDU}$) for a short GI.
Figure 20:
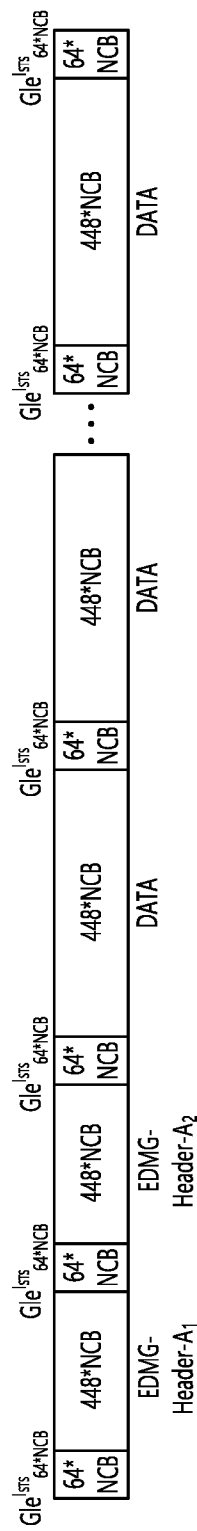
FIG. 20 is an example of an SU PPDU structure ($2 \leq i_{PPDU} \leq N_{PPDU}$) for a normal GI.
Figure 21:
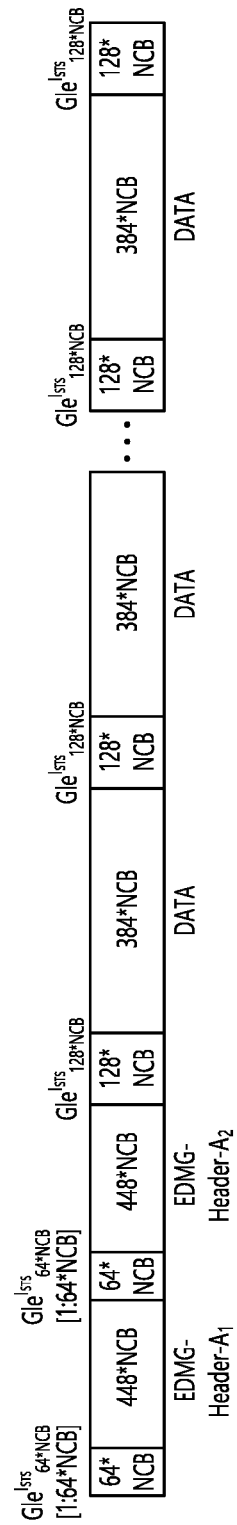
FIG. 21 is an example of an SU PPDU structure ($2 \leq i_{PPDU} \leq N_{PPDU}$) for a long GI.

The SU PPDU structure for a first EDMG PPDU (i.e., $i_{PPDU}=1$) within the EDMG A-PPDU is shown in FIG. 15 to FIG. 17. The SU PPDU structures for EDMG PPDUs subsequent to the first EDMG PPDU (i.e., $2<=i_{PPDU}<=N_{PPDU}$), when using a short GI, a normal GI, and a long GI, are shown in FIG. 19 to FIG. 21, respectively. A last block that is transmitted from each EDMG PPDU within the EDMG A-PPDU is followed by the same GI as the data field regardless of the value of an additional EDMG PPDU field within the EDMG-Header-A.

FIG. 19 is an example of an SU PPDU structure ($2<=i_{PPDU}<=N_{PPDU}$) for a short GI.

Referring to FIG. 19, the GI that is appended to the Data field is $GIe^{iSTS}_{32*NCB}$, which indicates that the GI is a short GI.

FIG. 20 is an example of an SU PPDU structure ($2<=i_{PPDU}<=N_{PPDU}$) for a normal GI.

Referring to FIG. 20, the GI that is appended to the Data field is $GIe^{iSTS}_{64*NCB}$, which indicates that the GI is a normal GI.

FIG. 21 is an example of an SU PPDU structure ($2<=i_{PPDU}<=N_{PPDU}$) for a long GI.

Referring to FIG. 21, the GI that is appended to the Data field is $GIe^{iSTS}_{128*NCB}$, which indicates that the GI is a long GI.

At this point, an EDMG-Header of a first PPDU that configures an A-PPDU and EDMG-Headers of the subsequent (or following) PPDUs including a second PPDU have different modulation schemes. Additionally, the following constraints exist even for configuring an L-Header. Firstly, the L-Header in an A-PPDU is configured as described below.

For an EDMG control mode PPDU and a non-EDMG control mode PPDU, the L-Header field is the same as a DMG control mode header field except for reserved bits 22 and 22 bits all being set to 1.

A Turnaround field and a Scrambler Initialization field within the L-Header indicate a transmission mode.

If the Turnaround field is equal to 0, interpretation of the Scrambler Initialization field is defined as follows.

TABLE 3

| Scrambler Initialization field | | | | |
|---|---|---|---|---|
| B0 | B1 | B2 | B3 | Definition |
| 0 | 0 | R | R | Corresponds to the TXVECTOR parameter SCRAMBLER_INIT_SETTING equal to CONTROL_TRAILER. Indicates the presence of the control trailer in the PPDU. The content of the control trailer depends on the type of frame contained in the PPDU (see 28.3.7). |
| 0 | 1 | R | R | Corresponds to the TXVECTOR parameter SCRAMBLER_INIT_SETTING equal to EDMG-Header-A. Indicates the presence of the EDMG-Header-A field. This implies that the PPDU is an EDMG control mode PPDU. |

TABLE 3-continued

| Scrambler Initialization field | | | | |
|---|---|---|---|---|
| B0 | B1 | B2 | B3 | Definition |
| 1 | 0 | R | R | Reserved |
| 1 | 1 | R | R | Reserved |

NOTE-
"R" indicates that this bit field is reserved.

If the Turnaround field is equal to 1, a PPDU includes RTS, DMG CTS, DMG DTS, or CF-End frame, interpretation of the Scrambler Initialization field is defined as follows and indicates a channel bandwidth of the PPDU.

TABLE 4

| Scrambler Initialization field | | | | Requested channel | 2.16 GHz channel(s) making up |
|---|---|---|---|---|---|
| B0 | B1 | B2 | B3 | bandwidth | the requested channelization |
| 0 | 0 | 0 | 0 | 2.16 GHz | Any one of 1, 2, 3, 4, 5, 6, 7, 8 |
| 1 | 0 | 0 | 0 | 4.32 GHz or 2.16 + 2.16 GHz | 1 and 2, 3 and 4, 5 and 6, 7 and 8 |
| 0 | 1 | 0 | 0 | 4.32 GHz or 2.16 + 2.16 GHz | 2 and 3, 4 and 5, 1 and 6 |
| 1 | 1 | 0 | 0 | 6.48 GHz | 1-3, 4-6 |
| 0 | 0 | 1 | 0 | 6.48 GHz | 2-4, 5-7 |
| 1 | 0 | 1 | 0 | 6.48 GHz | 3-5, 6-8 |
| 0 | 1 | 1 | 0 | 8.64 GHz or 4.32 + 4.32 GHz | 1-4 |
| 1 | 1 | 1 | 0 | 8.64 GHz or 4.32 + 4.32 GHz | 2-5 |
| 0 | 0 | 0 | 1 | 8.64 GHz or 4.32 + 4.32 GHz | 3-6 |
| 1 | 0 | 0 | 1 | 2.16 + 2.16 GHz | 1 and 3, 4 and 6 |
| 0 | 1 | 0 | 1 | 2.16 + 2.16 GHz | 2 and 4, 3 and 5 |
| 1 | 1 | 0 | 1 | 2.16 + 2.16 GHz | 1 and 4, 2 and 5, 3 and 6 |
| 0 | 0 | 1 | 1 | 2.16 + 2.16 GHz | 1 and 5, 2 and 6, 3 and 7, 4 and 8 |
| 1 | 0 | 1 | 1 | 4.32 + 4.32 GHz | 1-2 and 4-5 |
| 0 | 1 | 1 | 1 | 4.32 + 4.32 GHz | 2-3 and 5-6 |
| 1 | 1 | 1 | 1 | 4.32 + 4.32 GHz | 28-2 and 4-6 |

For an EDMG SC mode PPDU and an EDMG OFDM mode PPDU, the L-Header field is the same as an DMG SC mode PHY header including the following changes.
  Reserved bits 46 are set to 1 for indicating the presence of an EDMG-Header-A field. This implies that the PPDU is an EDMG PPDU.
  A Last RSSI field is re-defined as follows.

TABLE 5

| Bit number | Field name | Definition |
|---|---|---|
| B0 | IsSC | Tf set to 1, this field indicates that the PSDU is modulated using SC (see 28.5). Otherwise if set to 0, this field indicates that the PSDU is modulated using OFDM (see 28.6). If modulated using SC, the PPDU is termed as EDMG SC (mode) PPDU. If modulated using OFDM, the PPDU is termed as EDMG OFDM (mode) PPDU. |
| B1 | IsSISO | If set to 1, this field indicates that the PPDU is a single space-time stream PPDU. Otherwise, the PPDU encodes more than one space-time stream. |
| B2-B3 | GI Length | This field indicates the type of GI used in the PPDU and is set as follows: set to 0 for short GI, set to 1 for normal GI, and set to 2 for long GI. Value of 3 is reserved. |

5 LSBs of a Length field are re-defined as follows.

TABLE 6

| Bit number | Field name | Definition |
|---|---|---|
| B0-B4 | Compressed BW | The Compressed BW field indicates the bandwidth over which the PPDU is transmitted. Possible values for this field are defined in Table 28-9. Values not listed in Table 28-9 are reserved. |

For an EDMG SC mode A-PPDU or an EDMG OFDM mode A-PPDU, the L-Header field is the same as an EDMG SC mode PPDU and an EDMG OFDM mode PPDU, which are defined by the changes described below.

When an actual A-PPDU duration is not notified at an L-Header transmission time point, remaining bits of the Length field should be configured so that a PPDU duration, which is calculated based on the L-header, is shorter than an aPPDUMaxTime and the remaining TXOP duration period within a range of an actual PPDU duration of the first PPDU within the A-PPDU. In order to satisfy spoofing error requirements, padding should be applied.

In case of an EDMG A-PPDU, an EDMG-Header-A field may be defined as follows.

The SU/MU Format field shall be set to 0 for all EDMG PPDUs comprising the EDMG A-PPDU.

The PSDU Length and EDMG-MCS fields may be set to different values for EDMG PPDUs comprising the EDMG A-PPDU.

The Additional EDMG PPDU field shall be set to 1 for all EDMG PPDUs, except for the last EDMG PPDU where it shall be set to 0.

The EDMG TRN Length field shall be set to 0 for all EDMG PPDUs, except for the last EDMG PPDU where it may be set to a nonzero value.

The RX TRN-Units per Each TX TRN-Unit, EDMG TRN-Unit P, EDMG TRN-Unit M, EDMG TRN-Unit N, TRN Subfield Sequence Length, TRN-Unit RX Pattern, EDMG Beam Tracking Request, EDMG Beam Tracking Request Type, DMG TRN, First Path Training and Dual Polarization TRN Training fields are reserved for all EDMG PPDUs, except the last EDMG PPDU. For the last EDMG PPDU in the EDMG A-PPDU, the values of these fields may be set based on the TRN field parameters and EDMG TRN Length field value.

The Channel Aggregation, BW, Primary Channel Number, Beamformed, Short/Long LDPC, STBC Applied, Number of SS, Number of Transmit Chains, and NUC Applied fields shall have the same value for all EDMG PPDUs comprising the EDMG A-PPDU.

The DCM BPSK Applied field shall have the same value for all EDMG PPDUs comprising the EDMG A-PPDU. The conditions on DCM BPSK modulation usage shall be met as defined in 28.5.9.5.3 and 28.6.9.3.4 for the EDMG SC and EDMG OFDM modes, respectively. If conditions are not met, then the DCM BPSK Applied field is reserved for all EDMG PPDUs comprising the EDMG A-PPDU.

The Phase Hopping and Open Loop Precoding fields shall have the same value for all EDMG PPDUs comprising the OFDM EDMG A-PPDU. The conditions on phase hopping modulation usage shall be met as defined in 28.6.9.3.8. If conditions are not met, the Phase Hopping and Open Loop Precoding fields are reserved for all EDMG PPDUs comprising the EDMG A-PPDU.

The Superimposed Code Applied field shall have the same value for all EDMG PPDUs comprising the EDMG A-PPDU. The receiver shall ignore the Superimposed Code Applied field if the EDMG-MCS field does not indicate the LDPC code rate-7/8.

The $\pi/2$-8-PSK Applied field shall have the same value for all EDMG PPDUs comprising the EDMG A-PPDU. The receiver shall ignore the $\pi/2$-8-PSK Applied field if the EDMG-MCS field does not indicate EDMG-MCS 12 or 13.

The Reserved field is reserved for all EDMG PPDUs comprising the EDMG A-PPDU.

The CRC field is computed based on the EDMG-Header-A content for a given EDMG PPDU and may have different values for EDMG PPDUs comprising the EDMG A-PPDU.

Modulation schemes of EDMG-Headers of subsequent PPDUs including the second PPDU configuring the A-PPDU are as follows.

An EDMG-Header-A field of the a EDMG PPDU (i.e., $i_{PPDU}=1$, wherein $i_{PPDU}$ indicates an index of a PPDU for an EDMG A-PPDU) within an EDMG SC mode A-PPDU is encoded and modulated as described below.

For an $i_{PPDU}$-th EDMG PPDU (wherein $i_{PPDU}>1$) in the EDMG SC mode A-PPDU, an EDMG-Header-A field is encoded and modulated as described below.

The input 112 header bits are appended with 16 HCS bits calculated as defined in 20.3.7.

The resulting 128 bits including CRC, $b=(b_1, b_2, \ldots, b_{128})$, are scrambled with the PN sequence as described in 20.3.9. starting from the first bit using a continuation of the scrambler bit sequence from the Data field of preceding EDMG PPDU in the EDMG SC mode A-PPDU to create the $bq=(bq_1, bq_2, \ldots, bq_{128})$ sequence.

The scrambled header bits, bq, are divided into two parts $bq1=(bq_1, bq_2, \ldots, bq_{64})$ and $bq2=(bq_{65}, bq_{66}, \ldots, bq_{128})$ of 64 bits each.

Two LDPC codewords of length 672 bits each are created by concatenating the 440 0s to each part, bq1 and bq2, and then computing 168 parity bits $p1=(p1_1, p1_2, \ldots, p1_{168})$ and $p2=(p2_1, p2_2, \ldots, p2_{168})$ for bq1 and bq2, respectively, using the LDPC matrix with R=3/4 and $L_{CW}=672$ defined in 20.3.8.4. The LDPC codewords are defined as follows:

$cw_1=(bq_1, bq_2, \ldots, bq_{64}, 0_1, 0_2, \ldots 0_{440}, p2_1, p2_1, \ldots p_{168})$ $cw_2=(bq_{65}, bq_{66}, \ldots, bq_{128}, 0_1, 0_2, \ldots 0_{440}, p2_1, p2_1, \ldots p_{168})$ The padded 0s are discarded and two output codewords are defined as $c1=(c1_1, c1_2)$ and $c2=(c2_1, c2_2)$, where:

$c1_1=(bq_1, bq_2, \ldots, bq_{64}, p1_1, p1_2, \ldots, p1_{160})$ $c1_2=(bq_1, bq_2, \ldots, bq_{64}, p1_1, p1_2, \ldots, p1_{152}, p1_{161}, p1_{162}, \ldots, p1_{168})$ $c2_1=(bq_{65}, bq_{66}, \ldots, bq_{128}, p2_1, p2_2, \ldots, p2_{160})$ $c2_2=(bq_{65}, bq_{66}, \ldots, bq_{128}, p2_1, p2_2, \ldots, p2_{152}, p2_{161}, p2_{162}, \ldots p2_{168})$ For a PPDU transmitted over an $N_{CB} \times 2.16$ GHz channel, where $1 \leq N_{CB} \leq 4$, the data blocks are defined as a repetition of codeword c1 and c2 by $N_{CB}$ times:

cb1=c1, cb2=c2) for $N_{CB}=1$ cb1=(c1, c1), cb2=(c2, c2) for $N_{CB}=2$ cb1=(c1, c1, c1), cb2=(c2, c2, c2) for $N_{CB}=3$ cb1=(c1, c1, c1, c1), cb2−(c2, c2, c2, c2) for $N_{CB}=3$ For a PPDU transmitted using $N_{STS}(N_{STS}=1, 2, \ldots, 8)$ space-time streams, the data blocks cb1 and cb2 are concatenated as cb=(cb1, cb2) and the data block cb is repeated $N_{STS}$ times. Then, the $N_{STS}$ data blocks cb are scrambled continuously with the PN sequence defined in 28.5.9.3.2 without seed reset. The initial seed value is equal to all is $(1_1, 1_2, \ldots, 1_7)$. The scrambling starts at the $225^{th}$ bit and ends at the $(N_{STS} \times 896 \times N_{CB})^{th}$ bit. The first scrambled cb block is mapped to the first space-time stream and the second scrambled cb block to the second space-time stream, and so on.

The data blocks shall be modulated using $\pi/2$-BPSK modulation as defined in 20.5.3.2.4. Each of the modulated data blocks cb1 and c62 is prepended with $64 \times N_{CB}$ guard symbols, and the data block cb2 is appended with appropriate number of guard symbols as described in 28.5.9.2.3.

The EDMG-Header-A field for $i_{PPDU}$>1 is transmitted by applying the EDMG transmission format defined in 28.5.9.5.2.

4. Embodiment(s) Applicable to the Present Disclosure

In 11ay, an A-PPDU may be used. At this point, when an A-PPDU is used, and when a GI length is different from the legacy portion, a problem may occur in that an FFT window of a receiver is operated incorrectly. Therefore, the present disclosure proposes a method for resolving this problem.

Figure 22:
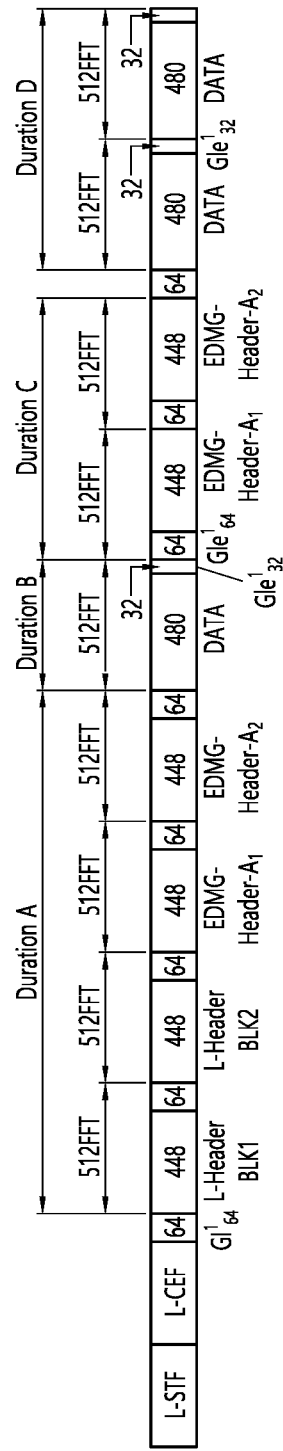
FIG. 22 shows an example of an A-PPDU format using a short GI.

For example, when $N_{STS}$=1 and $N_{CB}$=1, when the GI is a short GI and transmitted to an A-PPDU, the A-PPDU format is transmitted, as shown in FIG. 22.

FIG. 22 shows an example of an A-PPDU format using a short GI.

In FIG. 22, 512 FFT indicates an FFT window size when the receiver performs FFT in order to perform a frequency domain equalizer (FDE). And, FIG. 22 describes problems that may occur when performing FDE from Duration A to Duration D. In the present disclosure, it is assumed that a starting point of an FFT window of the receiver is set to be the same as a starting point of L-Header BLK1. Alternatively, although the FFT window may start based on a first $GI^1_{64}$ or the starting point of the FFT window may be a random point between the first $GI^1_{64}$ and the starting point of L-Header BLK1, the problems and proposed methods that will be described below may be applied as they are.

1. Duration A

A. Since the last 64 chips (samples) within the FFT window during the corresponding duration are the same as previous 64 chips (samples) apart from the FFT window size, the cyclic property is satisfied (or met). Therefore, there is no problem in performing FDE during the corresponding duration. This is illustrated in FIG. 23.

Figure 23:
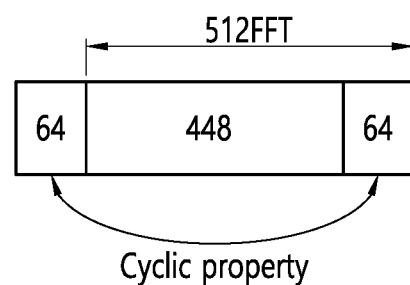
FIG. 23 shows an example of satisfying cyclic property when performing FDE during Duration A of the A-PPDU shown in FIG. 22.

FIG. 23 shows an example of satisfying cyclic property when performing FDE during Duration A of the A-PPDU shown in FIG. 22.

2. Duration B

A. Since the last 32 chips (samples) within the FFT window during the corresponding duration are the same as the next 32 chips (samples) of previous 64 chips (samples) apart from the FFT window size, the cyclic property is satisfied. Therefore, there is no problem in performing FDE during the corresponding duration. This is illustrated in FIG. 24.

Figure 24:
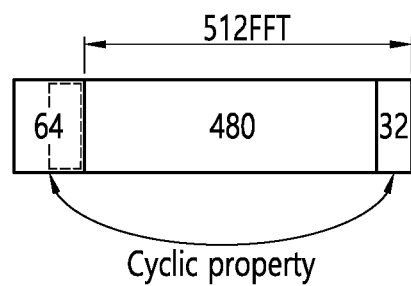
FIG. 24 shows an example of satisfying cyclic property when performing FDE during Duration B of the A-PPDU shown in FIG. 22.

FIG. 24 shows an example of satisfying cyclic property when performing FDE during Duration B of the A-PPDU shown in FIG. 22.

3. Duration C

A. Since none of the last 32 or 64 chips (samples) are the same as the previous chips (samples) apart from the FFT window size, the cyclic property is not satisfied. This is illustrated in FIG. 25.

Figure 25:
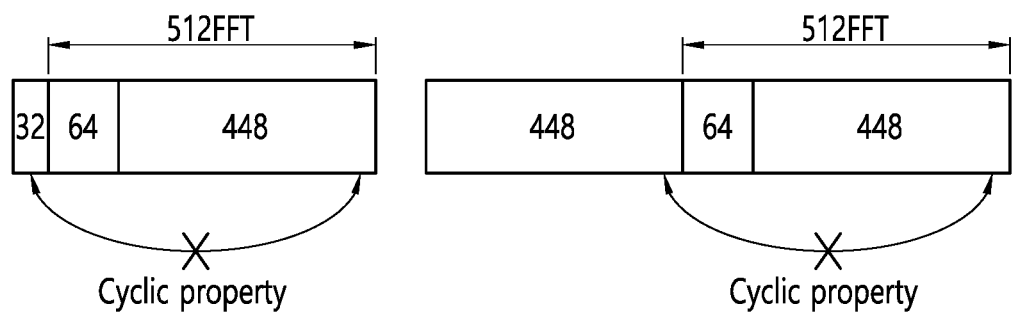
FIG. 25 shows an example of satisfying cyclic property when performing FDE during Duration C of the A-PPDU shown in FIG. 22.

FIG. 25 shows an example of satisfying cyclic property when performing FDE during Duration C of the A-PPDU shown in FIG. 22.

4. Duration D

A. When it is assumed that, during the corresponding duration, the receiver completes the decoding of the L-Header and the EDMG-Header-A of the first PPDU and, therefore, recognizes the GI type (short, normal or long) and knows the PSDU length of the first PPDU, the starting point of a receive FFT window size may be adjusted. Since the last 32 chips (samples) within the FFT window during the corresponding duration are the same as the next 32 chips (samples) of previous 64 chips (samples) apart from the FFT window size, the cyclic property is satisfied. Therefore, there is no problem in performing FDE during the corresponding duration. This is illustrated in FIG. 26.

Figure 26:
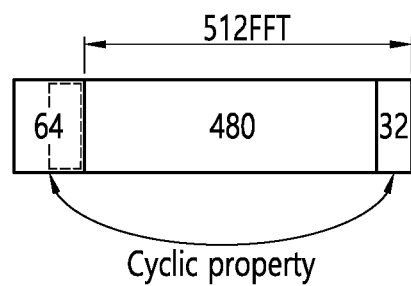
FIG. 26 shows an example of satisfying cyclic property when performing FDE during Duration D of the A-PPDU shown in FIG. 22.

FIG. 26 shows an example of satisfying cyclic property when performing FDE during Duration D of the A-PPDU shown in FIG. 22.

Figure 27:
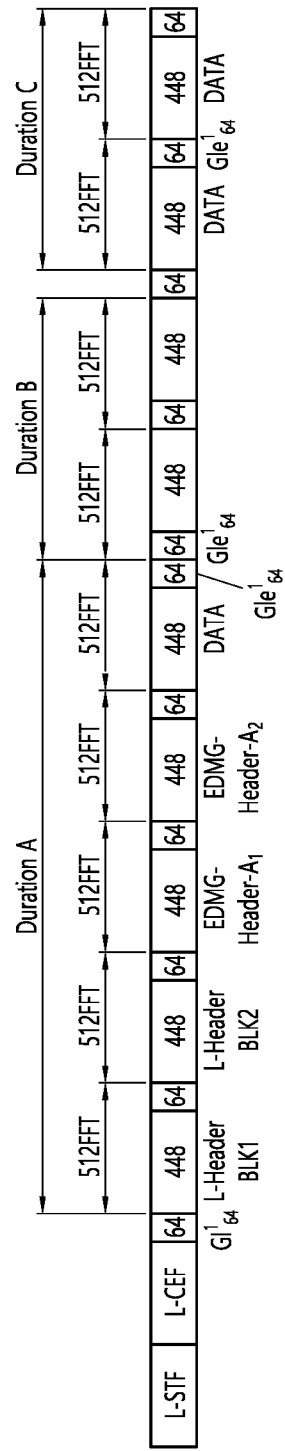
FIG. 27 shows an example of an A-PPDU format using a normal GI.

As another example, when $N_{STS}$=1 and $N_{CB}$=1, when the GI is a normal GI and transmitted to an A-PPDU, the A-PPDU format is transmitted, as shown in FIG. 27.

FIG. 27 shows an example of an A-PPDU format using a normal GI.

1. Duration A

A. Since the last 64 chips (samples) within the FFT window during the corresponding duration are the same as previous 64 chips (samples) apart from the FFT window size, the cyclic property is satisfied. Therefore, there is no problem in performing FDE during the corresponding duration. This is illustrated in FIG. 28.

Figure 28:
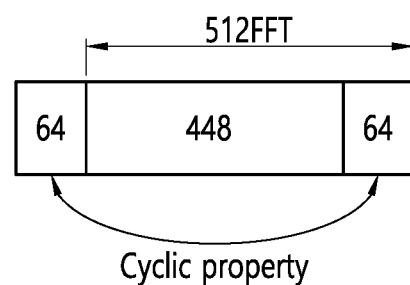
FIG. 28 shows an example of satisfying cyclic property when performing FDE during Duration A of the A-PPDU shown in FIG. 27.

FIG. 28 shows an example of satisfying cyclic property when performing FDE during Duration A of the A-PPDU shown in FIG. 27.

2. Duration B

A. Since none of the last 64 chips (samples) are the same as previous 64 chips (samples) apart from the FFT window size, the cyclic property is not satisfied. This is illustrated in FIG. 29.

Figure 29:
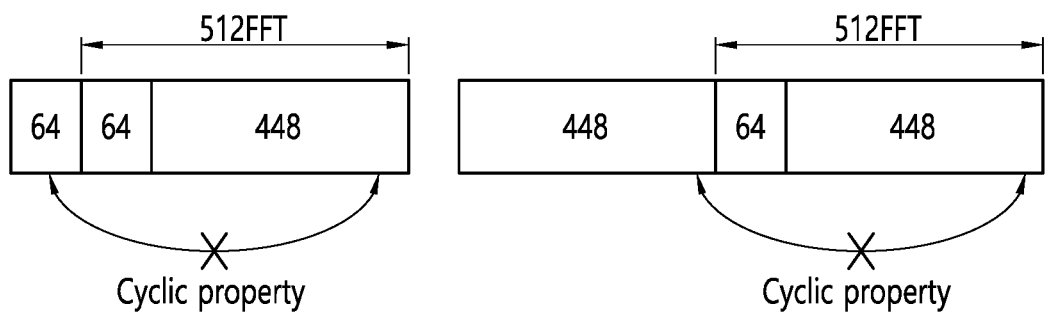
FIG. 29 shows an example of satisfying cyclic property when performing FDE during Duration B of the A-PPDU shown in FIG. 27.

FIG. 29 shows an example of satisfying cyclic property when performing FDE during Duration B of the A-PPDU shown in FIG. 27.

3. Duration C

A. When it is assumed that, during the corresponding duration, the receiver completes the decoding of the L-Header and the EDMG-Header-A of the first PPDU and, therefore, recognizes the GI type (short, normal or long) and knows the PSDU length of the first PPDU, the starting point of a receive FFT window size may be adjusted. Since the last 64 chips (samples) within the FFT window during the corresponding duration are the same as previous 64 chips (samples) apart from the FFT window size, the cyclic property is satisfied. Therefore, there is no problem in performing FDE during the corresponding duration. This is illustrated in FIG. 30.

Figure 30:
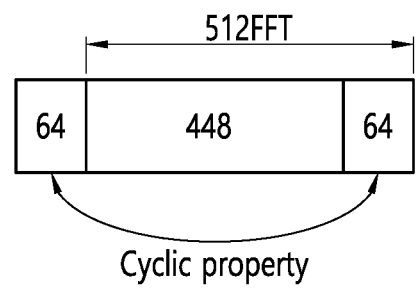
FIG. 30 shows an example of satisfying cyclic property when performing FDE during Duration C of the A-PPDU shown in FIG. 27.

FIG. 30 shows an example of satisfying cyclic property when performing FDE during Duration C of the A-PPDU shown in FIG. 27.

Figure 31:
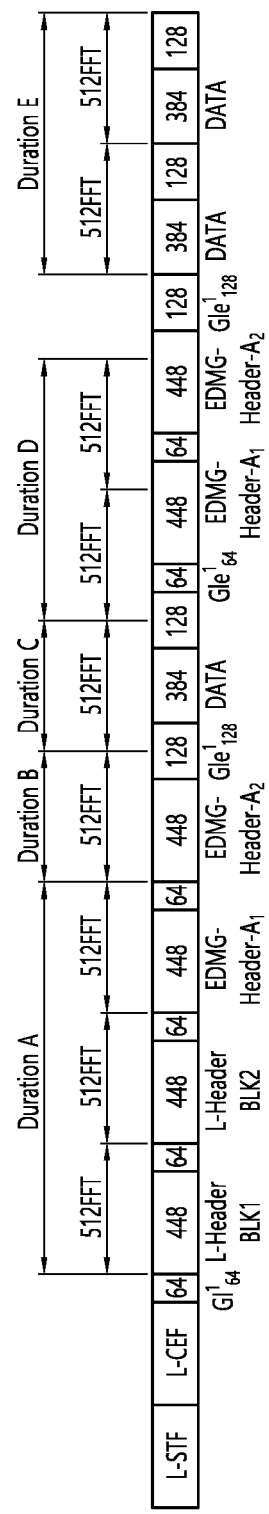
FIG. 31 shows an example of an A-PPDU format using a long GI.

As yet another example, when $N_{STS}$=1 and $N_{CB}$=1, when the GI is a long GI and transmitted to an A-PPDU, the A-PPDU format is transmitted, as shown in FIG. 31.

FIG. 31 shows an example of an A-PPDU format using a long GI.

1. Duration A

A. Since the last 64 chips (samples) within the FFT window during the corresponding duration are the same as previous 64 chips (samples) apart from the FFT window size, the cyclic property is satisfied. Therefore, there is no problem in performing FDE during the corresponding duration. This is illustrated in FIG. 32.

Figure 32:
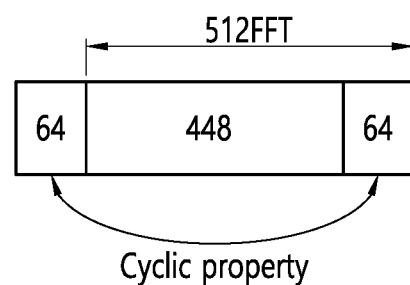
FIG. 32 shows an example of satisfying cyclic property when performing FDE during Duration A of the A-PPDU shown in FIG. 31.

FIG. 32 shows an example of satisfying cyclic property when performing FDE during Duration A of the A-PPDU shown in FIG. 31.

2. Duration B

A. Since the first 64 chips (samples) of the last 128 chips (samples) within the FFT window during the corresponding duration are the same as previous 64 chips (samples) apart from the FFT window size, the cyclic property is satisfied. Therefore, there is no problem in performing FDE during the corresponding duration. This is illustrated in FIG. 33.

Figure 33:
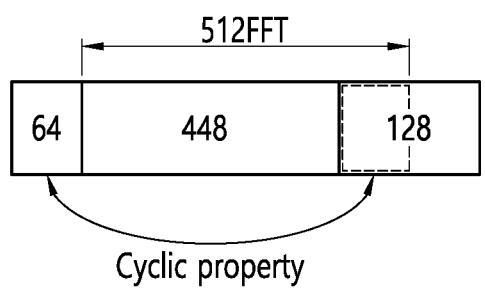
FIG. 33 shows an example of satisfying cyclic property when performing FDE during Duration B of the A-PPDU shown in FIG. 31.

FIG. 33 shows an example of satisfying cyclic property when performing FDE during Duration B of the A-PPDU shown in FIG. 31.

3. Duration C

A. Since the first 64 chips (samples) of the last 128 chips (samples) within the FFT window during the corresponding duration are the same as first 64 chips (samples) of previous 128 chips (samples) apart from the FFT window size, the cyclic property is satisfied. Therefore, there is no problem in performing FDE during the corresponding duration. This is illustrated in FIG. 34.

Figure 34:
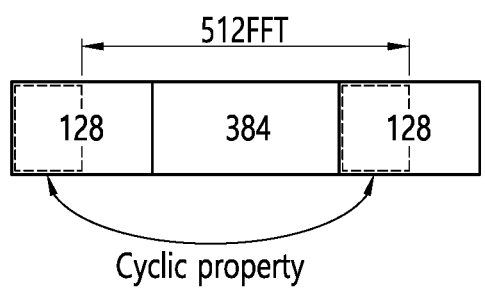
FIG. 34 shows an example of satisfying cyclic property when performing FDE during Duration C of the A-PPDU shown in FIG. 31.

FIG. 34 shows an example of satisfying cyclic property when performing FDE during Duration C of the A-PPDU shown in FIG. 31.

4. Duration D

A. Since none of the last 64 or 128 chips (samples) are the same as previous chips (samples) apart from the FFT window size, the cyclic property is not satisfied. This is illustrated in FIG. 35.

Figure 35:
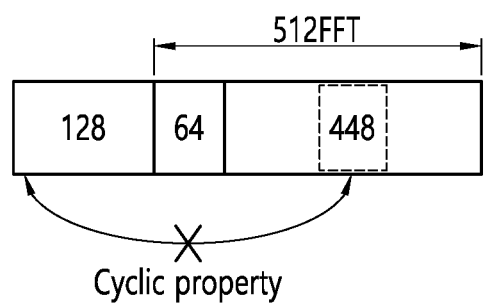
FIG. 35 shows an example of satisfying cyclic property when performing FDE during Duration D of the A-PPDU shown in FIG. 31.

FIG. 35 shows an example of satisfying cyclic property when performing FDE during Duration D of the A-PPDU shown in FIG. 31.

5. Duration E

A. When it is assumed that, during the corresponding duration, the receiver completes the decoding of the L-Header and the EDMG-Header-A of the first PPDU and, therefore, recognizes the GI type (short, normal or long) and knows the PSDU length of the first PPDU, the starting point of a receive FFT window size may be adjusted. Since the last 128 chips (samples) within the FFT window during the corresponding duration are the same as previous 128 chips (samples) apart from the FFT window size, the cyclic property is satisfied. Therefore, there is no problem in performing FDE during the corresponding duration. This is illustrated in FIG. 36.

Figure 36:
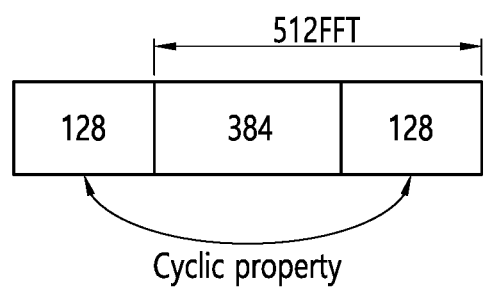
FIG. 36 shows an example of satisfying cyclic property when performing FDE during Duration E of the A-PPDU shown in FIG. 31.

FIG. 36 shows an example of satisfying cyclic property when performing FDE during Duration E of the A-PPDU shown in FIG. 31.

As described above, in order to resolve the problems of Duration C in the short GI, Duration B in the normal GI, and Duration D of the long GI, the following method is proposed.

In the durations during which the aforementioned problems occur, the problems are generated because the durations received an EDMG-Header-A of the second PPDU in a situation where GI type information and length information of the first PPDU are not obtained. (That is, the problems occur due to a decoding delay in the L-Header and the EDMG-Header-A.) Therefore, in order to delay (or postpone) the receiving time point, a minimum number of Single carrier blocks or a number of OFDM symbols of the first PPDU.

When applying the above-described method, since the lengths of duration B in the short GI, duration A in the normal GI, and duration C in the long GI are sufficiently long, GI type information and length information of the first PPDU may be obtained by completing the decoding of the L-Header and the EDMG-Header-A during the corresponding duration time. And, thus, the starting point of the receive FFT window size may be adjusted. Therefore, by substituting duration C in the short GI, duration B in the normal GI, and duration D in the long GI with duration D in the short GI, duration C in the normal GI, and duration E in the long GI, respectively, problems in performing FDE do not occur.

A time for decoding the L-Header or EDMG-Header-A is as shown below in the following table for a more concrete embodiment of the above-described method.

TABLE 7

| Process | Simple Pipeline | Faster Pipeline |
| --- | --- | --- |
| Phase compensation | 1/2 SC-BLK | 1/2 SC-BLK |
| FFT | 1 SC-BLK | 1 SC-BLK |
| Equalizer | 1 SC-BLK | 1/2 SC-BLK |
| IFFT | 1 SC-BLK | 1 SC-BLK |
| Demapping & Combining | 1 SC-BLK | 1/2 SC-BLK |
| LDPC | 1 SC-BLK | 1/2 SC-BLK |
| CRC and Decoding | 1/4 SC-BLK | 1/4 SC-BLK |
| Overhead (buffers, transfers, sync . . .) | 1 SC-BLK | 1 SC-BLK |
| Total: | 6.75 SC-BLK (27 Golays) | 5.25 + SC-BLK (21 + Golays) |

That is, when implementing the method by using a simple pipeline method, in or der to obtain GI type information and length information of the first PPDU, 6.75 SC blocks are needed after EDMG-Header-A2. Therefore, in the proposed method, a minimum number of SC blocks or a minimum number of OFDM symbols of the first PPDU configuring the A-PPDU is limited to 7. Alternatively, when assuming that a faster pipeline is used, the number may be calculated to be equal to 6 or a natural number ranging from 3 to 6. At this point, the value of 3 means a number of SC blocks or a minimum number of OFDM symbols that is needed when the fastest implementation method is used. Additionally, 512 chips (samples) within an FFT window size are represented by one SC block or OFDM symbol.

That is, the transmitting apparatus sets $N_{BLKS}$ or $N_{SYMS}$ of the first PPDU to a minimum (or smallest) value and performs zero padding corresponding to the minimum value on the data of the first PPDU. For example, the transmitting apparatus sets the number of SC blocks or OFDM symbols of the first PPDU to a total of 7 (in case of a simple pipeline), and, then, the transmitting apparatus inserts additional 6 SC blocks or OFDM symbols as dummy (or performs zero padding on the additional 6 SC blocks or OFDM symbols).

A formalization of the aforementioned proposed method may be expressed as follows.

transmitting apparatus sets the number of OFDM symbols of the first EDMG PPDU to $N_{APPDU\_SYMSmin}$.

Additionally, the following parameter may be added to TXVECTOR.

TABLE 8

| Parameter | Condition | Value | TXVECTOR | RXVECTOR |
|---|---|---|---|---|
| EDMG_FIRST_PPDU_MIN_SC_BLOCKS | FORMAT is EDMG, EDMG_ADD_PPDU = 1, $i_{PPDU}$ = 1 | Indicates the minimum duration of the Data field of the first EDMG PPDU (i.e., $i_{PPDU}$ = 1) within the EDMG A-PPDU in units of SC IDFT/DFT period. | Y | N |

A minimum duration of a data field of a first EDMG PPDU (i.e., $i_{PPDU}$=1) within an EDMG A-PPDU that is transmitted in the EDMG SC mode or the EDMG OFDM mode is designated by a TXVECTOR parameter EDMG_FIRST_PPDU_MIN_SC_BLOCKS.

When the A-PPDU is transmitted in the EDMG SC mode, $N_{APPDU\_BLKS\ min}$, which is the minimum number of SC symbol blocks of the first EDMG PPDU (i.e., $i_{PPDU}$=1) within the EDMG A-PPDU, should be the same as the TXVECTOR parameter DMG_FIRST_PPDU_MIN_SC_BLOCKS value. When needed, the data field of the first EDMG PPDU (i.e., $i_{PPDU}$=1) within the EDMG A-PPDU should be extended by performing additional zero padding in order to generate the required (or needed) number of EDMG SC blocks.

When the A-PPDU is transmitted in the EDMG OFDM mode, the minimum number of OFDM symbol blocks $N_{APPDU\_SYMSmin}$ is defined as follows.

$$N_{APPDU\_SYMSmin} = \left\lceil N_{APPDU\_BLKSmin} \cdot \frac{T_{DFT}^{(SC)}}{T_{DFT}^{(OFDM)} + T_{GI}^{(OFDM)}} \right\rceil \quad \text{[Equation 1]}$$

Herein, $N_{APPDU\_BLKS\ min}$ is a TXVECTOR parameter EDMG_FIRST_PPDU_MIN_SC_BLOCKS value.

$T_{DFT(SC)}$ is an SC Inverse Discrete Fourier Transform/Discrete Fourier Transform (IDFT/DFT) period.

$T_{DFT(OFDM)}$ is an OFDM IDFT/DFT period.

$T_{GI(OFDM)}$ is a guard interval (GI) duration of an EDMG PPDU.

When needed, the data field of a first EDMG PPDU (i.e., $i_{PPDU}$=1) within an EDMG A-PPDU should be extended by performing additional zero padding in order to generate a required (or needed) number of EDMG SC blocks.

Additionally, the following detail is added to LDPC encoding for SC.

If first PPDU in A-PPDU and $N_{BLKS\ iuser}$<$N_{APPDU\_BLKSmin}$, then $N_{BLKS\ iuser}$=$N_{APPDU\_BLKSmin}$ That is, when the number of SC blocks of a first EDMG PPDU within the EDMG A-PPDU is smaller than $N_{APPDU\_BLKS\ min}$ (the TXVECTOR parameter EDMG_FIRST_PPDU_MIN_SC_BLOCKS value), the transmitting apparatus sets the number of SC blocks of the first EDMG PPDU to $N_{APPDU\_BLKS\ min}$.

The following detail is added to LDPC encoding for OFDM.

If first PPDU in A-PPDU and $N_{SYMS\ iuser}$<$N_{APPDU\_SYMSmin}$, then $N_{SYMS\ iuser}$=$N_{APPDU\_SYMSmin}$ That is, in case a number of OFDM symbols of the first EDMG PPDU within the EDMG A-PPDU is smaller than $N_{APPDU\_SYMSmin}$ (which is obtained by Equation 1), the transmitting apparatus sets the number of OFDM symbols of the first EDMG PPDU to $N_{APPDU\_SYMSmin}$.

The EDMG_FIRST_PPDU_MIN_SC_BLOCKS value may be signaled as described below. More specifically, the EDMG_FIRST_PPDU_MIN_SC_BLOCKS value may be i) negotiated through EDMG Capabilities elements and then transmitted, or ii) managed as a fixed value, or iii) set to EDMG_BRP_MIN_SC_BLOCKS (wherein Capabilities are already defined). The EDMG_BRP_MIN_SC_BLOCKS is a TXVECTOR parameter that indicates "the minimum duration of the Data field in units of SC IDFT/DFT period".

At this point, the EDMG_BRP_MIN_SC_BLOCKS should be set to, and the value should be set to aAPPDUmin-SCBlocks=7. Alternatively, the aAPPDUminSCBlocks may be calculated to be equal to 6 or a natural number ranging from 3 to 6.

Hereinafter, a method of configuring the first PPDU of the EDMG A-PPDU, as well as all PPDUs of the EDMG A-PPDU, to have a minimum number of SC symbols will be proposed.

When performing FDE in the EDMG A-PPDU, in order to satisfy cyclic property by using the GI, the receiving STA should first know the number of SC blocks in the A-PPDU in order to know an EDMG-Header position of a next PPDU.

The number of SC blocks in an N-th PPDU may be known through an EDMG-Header of the N-th PPDU, and, if an EDMG-Header of an (N+1)-th PPDU is received before demodulating the EDMG-Header of the N-th PPDU, since the cyclic property cannot be satisfied, performance degradation occurs.

In order to resolve this problem, when the minimum number of SC blocks of a PPDU within the EDMG A-PPDU is set to be greater than a demodulation delay time of the EDMG-Header, and when the PPDU length value is smaller than the minimum number of SC blocks, the number of SC blocks may be increased by performing zero padding. Thus, when performing signal detection, the cyclic property may be maintained.

Figure 37:
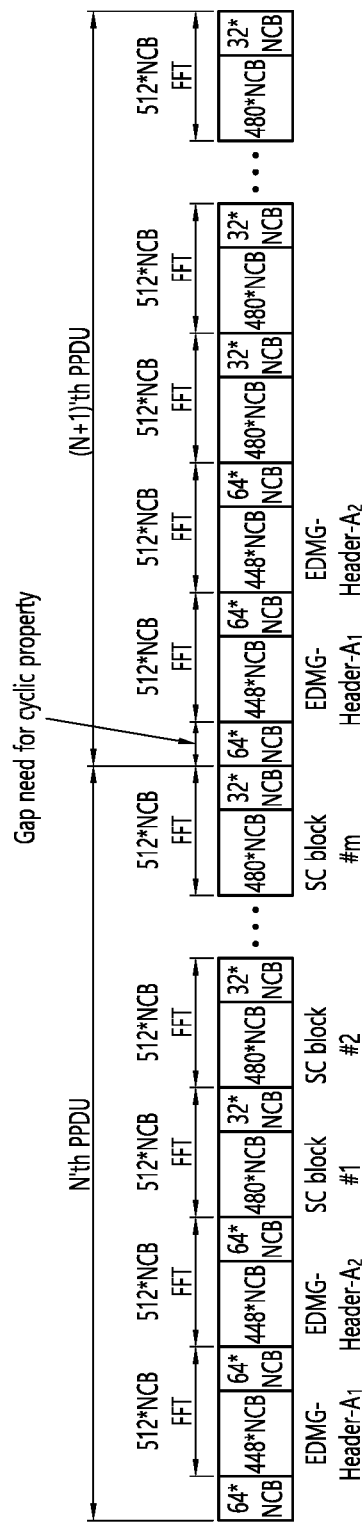
FIG. 37 shows an example of increasing the number of symbol blocks of an N-th PPDU in an A-PPDU using a short GI.

FIG. 37 shows an example of increasing the number of symbol blocks of an N-th PPDU in an A-PPDU using a short GI.

If the receiving STA receives an EDMG-Header-A of an (N+1)-th PPDU in a situation where the length information of the N-th PPDU is not obtained (before demodulating the EDMG-Header-A of the N-th PPDU), when the receiving STA performs FDE, the cyclic property using the GI cannot be satisfied.

Therefore, as shown in FIG. 37, by adding a gap (or zero padding) after the data field of the N-th PPDU, the transmitting STA may increase the number of SC blocks as much as the minimum number of SC blocks. Thus, when performing demodulation (when performing FDE) of the EDMG A-PPDU shown in FIG. 37, the receiving STA may satisfy the cyclic property.

Figure 38:
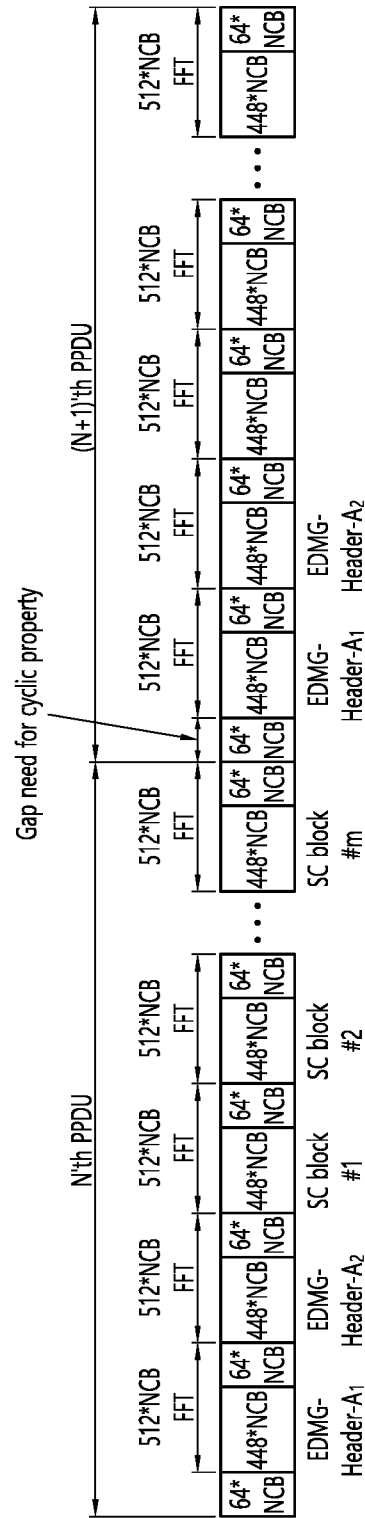
FIG. 38 shows an example of increasing the number of symbol blocks of an N-th PPDU in an A-PPDU using a normal GI.

FIG. 38 shows an example of increasing the number of symbol blocks of an N-th PPDU in an A-PPDU using a normal GI.

If the receiving STA receives an EDMG-Header-A of an (N+1)-th PPDU in a situation where the length information of the N-th PPDU is not obtained (before demodulating the EDMG-Header-A of the N-th PPDU), when the receiving STA performs FDE, the cyclic property using the GI cannot be satisfied.

Therefore, as shown in FIG. 38, by adding a gap (or zero padding) after the data field of the N-th PPDU, the transmitting STA may increase the number of SC blocks as much as the minimum number of SC blocks. Thus, when performing demodulation (when performing FDE) of the EDMG A-PPDU shown in FIG. 38, the receiving STA may satisfy the cyclic property.

Figure 39:
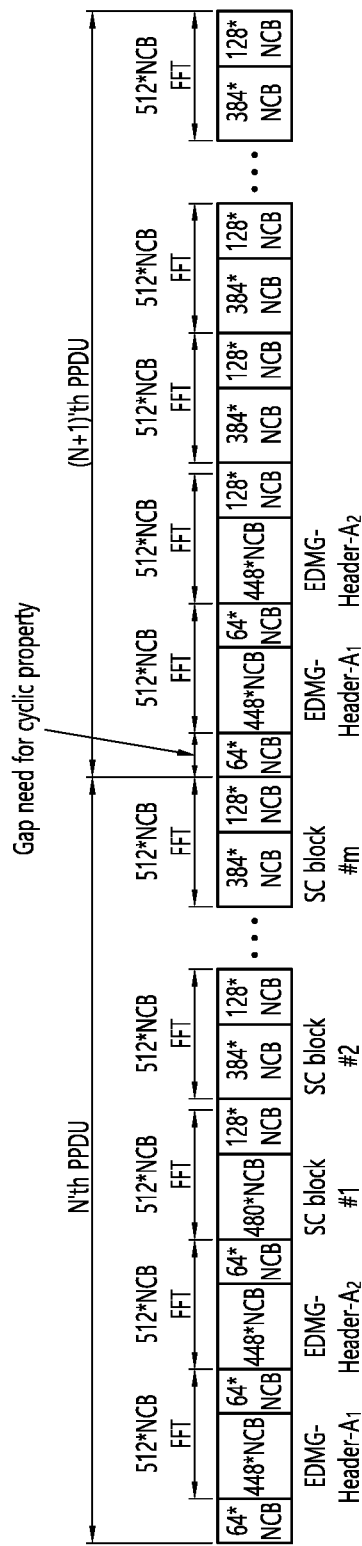
FIG. 39 shows an example of increasing the number of symbol blocks of an N-th PPDU in an A-PPDU using a long GI.

FIG. 39 shows an example of increasing the number of symbol blocks of an N-th PPDU in an A-PPDU using a long GI.

If the receiving STA receives an EDMG-Header-A of an (N+1)-th PPDU in a situation where the length information of the N-th PPDU is not obtained (before demodulating the EDMG-Header-A of the N-th PPDU), when the receiving STA performs FDE, the cyclic property using the GI cannot be satisfied.

Therefore, as shown in FIG. 39, by adding a gap (or zero padding) after the data field of the N-th PPDU, the transmitting STA may increase the number of SC blocks as much as the minimum number of SC blocks. Thus, when performing demodulation (when performing FDE) of the EDMG A-PPDU shown in FIG. 39, the receiving STA may satisfy the cyclic property.

That is, when needed, the data field of all EDMG PPDUs within an EDMG A-PPDU should be extended by performing additional zero padding in order to generate a required (or needed) number of EDMG SC blocks. In the present embodiment, the EDMG A-PPDU may be applied to both the SC mode and the OFDM mode.

That is, when the number of SC blocks of each EDMG PPDU within the EDMG A-PPDU is smaller than the TXVECTOR parameter EDMG_APPDU_MIN_SC_BLOCKS value, the transmitting STA sets the number of SC blocks of the corresponding EDMG PPDU to $N_{APPDU\_BLKS\ min}$.

Additionally, in case a number of OFDM symbols of each EDMG PPDU within the EDMG A-PPDU is smaller than $N_{APPDU\_SYMSmin}$ (which is obtained by Equation 1), the transmitting STA sets the number of OFDM symbols of the corresponding EDMG PPDU to $N_{APPDU\_SYMSmin}$.

Additionally, the following parameters may be added to TXVECTOR.

The EDMG_APPDU_MIN_SC_BLOCKS value may be signaled as described below. More specifically, the EDMG_APPDU_MIN_SC_BLOCKS value may be i) negotiated through EDMG Capabilities elements and then transmitted, or ii) managed as a fixed value, or iii) set to EDMG_BRP_MIN_SC_BLOCKS (wherein Capabilities are already defined). The EDMG_BRP_MIN_SC_BLOCKS is a TXVECTOR parameter that indicates "the minimum duration of the Data field in units of SC IDFT/DFT period".

At this point, the EDMG_BRP_MIN_SC_BLOCKS should be set to, and the value should be set to aAPPDUminSCBlocks=7. Alternatively, the aAPPDUminSCBlocks may be calculated to be equal to 6 or a natural number ranging from 3 to 6.

Figure 40:
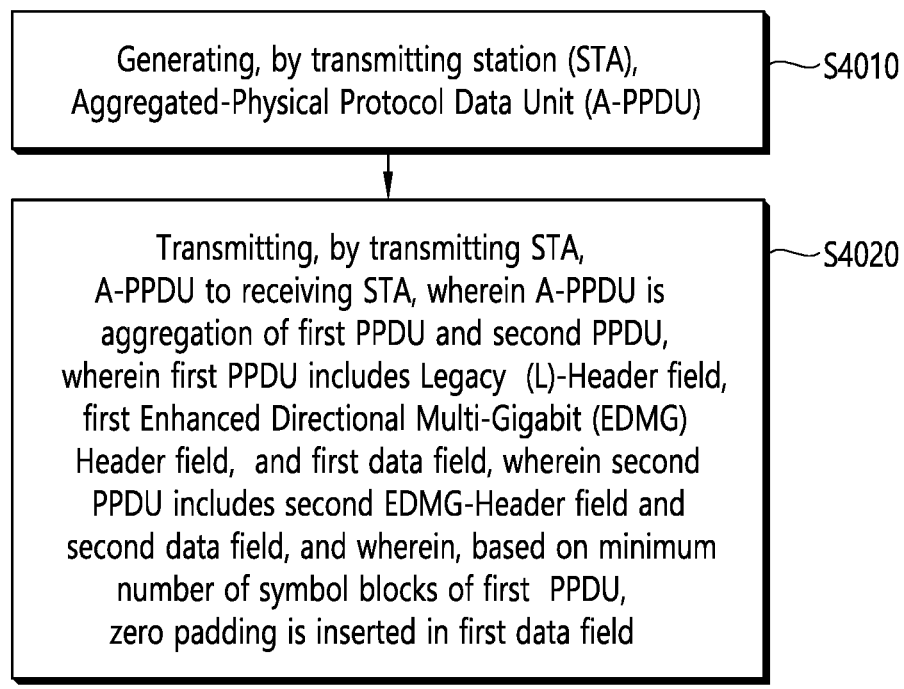
FIG. 40 is a flowchart showing a procedure of transmitting an A-PPDU by a transmitting STA according to the present embodiment.

FIG. 40 is a flowchart showing a procedure of transmitting an A-PPDU by a transmitting STA according to the present embodiment.

The present embodiment proposes a method of ensuring a minimum number of symbol blocks in an A-PPDU of an 802.11ay system and generating an A-PPDU. This is because, when a GI of a legacy part (non-EDMG portion) and a GI of an EDMG part (EDMG portion) are different, since an FFT window of a receiver becomes different, there lies a problem in that FDE cannot be performed. The present embodiment proposes a method for resolving the above-described problem.

Firstly, the terms will be described as follows. An A-PPDU may correspond to an Enhanced Directional Multi-Gigabit (EDMG) PPDU, which is defined in the 802.11 ay system. The transmitting STA may be an access point (AP) or a wireless audio/video (AV) apparatus (or device). The receiving STA may be a station (STA) or a wireless audio/video (AV) apparatus (or device). The wireless AV apparatus may be a main body device (set-top box, display device (TV), a remote controller device (remote).

In step S4010, the transmitting station (STA) generates an Aggregated-Physical Protocol Data Unit (A-PPDU).

In step S4020, the transmitting STA transmits the A-PPDU to a receiving STA.

The A-PPDU is an aggregation of a first PPDU and a second PPDU. The A-PPDU is generated by aggregating n number of EDMG PPDUs. And, although the present embodiment describes a case where n=2, the present disclosure will not always be limited to this.

The first PPDU includes a Legacy (L)-Header field, a first Enhanced Directional Multi-Gigabit (EDMG)-Header field, and a first data field.

The second PPFU includes a second EDMG-Header field and a second data field.

A GI may be inserted at both ends of the first and second data fields. Types of the GI may include a short GI, a normal GI, and a long GI.

The short GI may be generated based on a golay sequence having a length of 32. The normal GI may be generated

TABLE 9

| Parameter | Condition | Value | TXVECTOR | RXVECTOR |
|---|---|---|---|---|
| EDMG_APPDU_MIN_SC_BLOCKS | FORMAT is EDMG, EDMG_ADD_PPDU = n, $i_{PPDU}$ = n | Indicates the minimum duration of the Data field of the each EDMG PPDU (i.e., $i_{PPDU}$ = n) within the EDMG A-PPDU in units of SC IDFT/DFT period. | Y | N | based on a golay sequence having a length of 64. And, the long GI may be generated based on a golay sequence having a length of 128.

A GI that is inserted in the L-Header field may be generated based on a golay sequence having a length of 64. Accordingly, a length of a GI that is inserted in the L-Header field may be different from a length of a GI that is inserted in the first and second data fields. When GI lengths are different, a problem may occur in that the receiving STA cannot perform FDE due to a difference in the FFT window. The present embodiment proposes a method for resolving the above-described problems by adjusting a starting point of the FFT window of the receiving STA by extending a length of the first PPDU by adding zero padding or dummy value to the first PPDU.

Based on the minimum number of symbol blocks of the first PPDU, zero padding is inserted in the first data field. More specifically, a number of symbol blocks in the first data field having zero padding inserted therein may be configured to be equal to the minimum number of symbol blocks of the first PPDU. That is, by performing zero padding on the first PPDU, the present embodiment proposes a method for setting a number of symbol blocks to a minimum number of symbol blocks of the first PPDU.

According to a Simple Pipeline, a minimum number of symbol blocks of the first PPDU that are needed is equal to 7. According to Faster Pipeline, a minimum number of symbol blocks of the first PPDU that are needed is equal to 6.

When the A-PPDU is transmitted in an EDMG Single Carrier (SC) mode, a symbol block of the first data field may be an SC symbol block, and a minimum number of symbol blocks of the first PPDU ($N_{APPDU\_}BLKSmin$) may be configured based on an EDMG_FIRST_PPDU_MIN_SC_BLOCKS value of a TXVECTOR parameter.

When the A-PPDU is transmitted in an EDMG Orthogonal Frequency Division Multiplexing (OFDM) mode, a symbol block of the first data field may be an OFDM symbol block, and the minimum number of symbol blocks of the first PPDU ($N_{APPDU\_}SYMSmin$) may be configured based on first to fourth values.

The first value may be a value of the EDMG_FIRST_PPDU_MIN_SC_BLOCKS. The second value may be an SC Inverse Discrete Fourier Transform/Discrete Fourier Transform (IDFT/DFT) period. The third value may be an OFDM IDFT/DFT period. And, the fourth value may be a guard interval (GI) duration of the first and second PPDUs.

At this point, a value of the EDMG_FIRST_PPDU_MIN_SC_BLOCKS may be negotiated based on EDMG Capabilities elements, or determined as a fixed value, or configured as an EDMG_BRP_MIN_SC_BLOCKS value of the TXVECTOR parameter.

The L-Header field may include information on a length of the first PPDU. And, the first EDMG Header field may include information on a type of the GI.

Since zero padding has been performed on the first PPDU, the receiving STA may receive the second EDMG Header field of the second PPDU after obtaining length information and GI type information of the first PPDU. According to the embodiment, the receiving STA may delay (or postpone) a reception time point of the second EDMG Header field and may secure the length information and GI type information of the first PPDU by decoding the L-Header field and the first EDMG Header field.

At this point, the receiving STA may perform Frequency Domain Equalizer (FDE) per duration for the A-PPDU. The duration may be determined based on an FFT window size. The duration may have a size that is equivalent to a multiple of 512 chips (samples) according to 512 FFT.

When zero padding is not performed on the first PPDU, since a size (GI) of previous chips (samples) apart from an FFT window size for the second EDMG-Header field and a size of last chips (samples) within the FFT window size are not the same, the cyclic property is not satisfied. If the cyclic property is not satisfied, the receiving STA cannot perform FDE on the second EDMG-Header field.

However, according to the present embodiment, based on a minimum number of symbol blocks of the first PPDU, since zero padding is inserted in the first data field, a minimum number of symbol blocks may be secured based on a decoding pipeline (phase compensation, FFT, Equalizer, IFFT, Demapping&combining, LDPC, CRC and Decoding, Overhead) of the receiver. Thus, the receiving STA may obtain length information and GI type information of the first PPDU and may, then, be capable of adjusting a starting point of an FFT window. That is, the receiving STA may delay (or postpone) a receive starting point of the second EDMG Header to a time point after securing the length information and GI type information of the first PPDU. Thus, a cyclic property of the second EDMG-Header field may be satisfied based on the first data field having zero padding inserted therein. Since the cyclic property is satisfied, the receiving STA may perform FDE on the second EDMG-Header field.

The A-PPDU may be transmitted through a 2.16 GHz channel or 2.16+2.16 GHz channel ($N_{CB}$=1). And, the transmitting STA and the receiving STA may support one space-time stream ($N_{STS}$=1).

Figure 41:
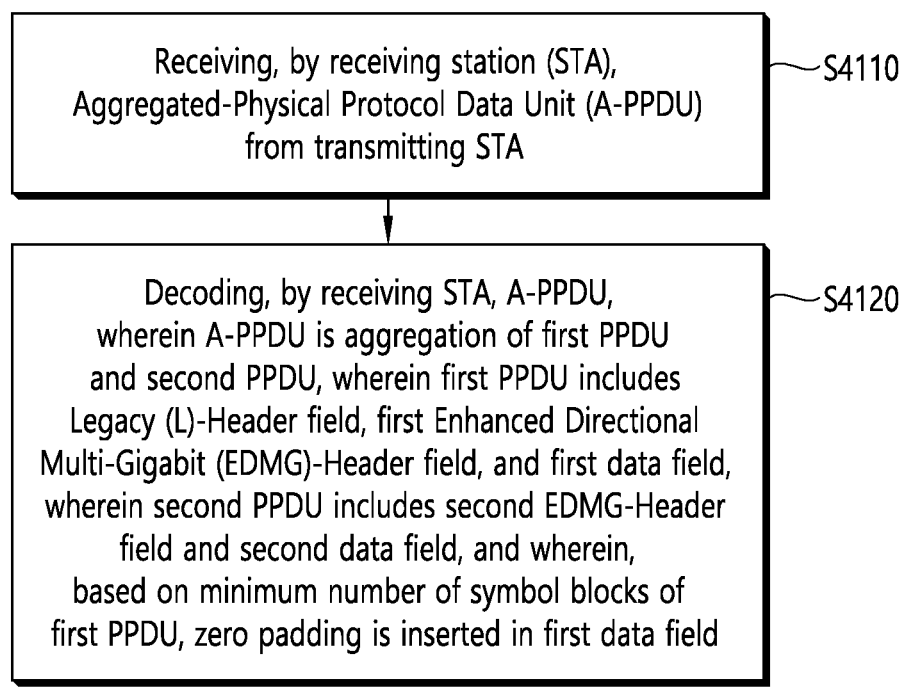
FIG. 41 is a flowchart showing a procedure of receiving an A-PPDU by a receiving STA according to the present embodiment.

FIG. 41 is a flowchart showing a procedure of receiving an A-PPDU by a receiving STA according to the present embodiment.

The present embodiment proposes a method of ensuring a minimum number of symbol blocks in an A-PPDU of an 802.11 ay system and generating an A-PPDU. This is because, when a GI of a legacy part (non-EDMG portion) and a GI of an EDMG part (EDMG portion) are different, since an FFT window of a receiver becomes different, there lies a problem in that FDE cannot be performed. The present embodiment proposes a method for resolving the above-described problem.

Firstly, the terms will be described as follows. An A-PPDU may correspond to an Enhanced Directional Multi-Gigabit (EDMG) PPDU, which is defined in the 802.11 ay system. The transmitting STA may be an access point (AP) or a wireless audio/video (AV) apparatus (or device). The receiving STA may be a station (STA) or a wireless audio/video (AV) apparatus (or device). The wireless AV apparatus may be a main body device (set-top box, display device (TV), a remote controller device (remote).

In step S4110, a receiving station (STA) receives an Aggregated-Physical Protocol Data Unit (A-PPDU) from a transmitting STA.

In step S4120, the receiving STA decodes the A-PPDU.

The A-PPDU is an aggregation of a first PPDU and a second PPDU. The A-PPDU is generated by aggregating n number of EDMG PPDUs. And, although the present embodiment describes a case where n=2, the present disclosure will not always be limited to this.

The first PPDU includes a Legacy (L)-Header field, a first Enhanced Directional Multi-Gigabit (EDMG)-Header field, and a first data field.

The second PPFU includes a second EDMG-Header field and a second data field.

A GI may be inserted at both ends of the first and second data fields. Types of the GI may include a short GI, a normal GI, and a long GI.

The short GI may be generated based on a golay sequence having a length of 32. The normal GI may be generated based on a golay sequence having a length of 64. And, the long GI may be generated based on a golay sequence having a length of 128.

A GI that is inserted in the L-Header field may be generated based on a golay sequence having a length of 64. Accordingly, a length of a GI that is inserted in the L-Header field may be different from a length of a GI that is inserted in the first and second data fields. When GI lengths are different, a problem may occur in that the receiving STA cannot perform FDE due to a difference in the FFT window. The present embodiment proposes a method for resolving the above-described problems by adjusting a starting point of the FFT window of the receiving STA by extending a length of the first PPDU by adding zero padding or dummy value to the first PPDU.

Based on the minimum number of symbol blocks of the first PPDU, zero padding is inserted in the first data field. More specifically, a number of symbol blocks in the first data field having zero padding inserted therein may be configured to be equal to the minimum number of symbol blocks of the first PPDU. That is, by performing zero padding on the first PPDU, the present embodiment proposes a method for setting a number of symbol blocks to a minimum number of symbol blocks of the first PPDU.

According to a Simple Pipeline, a minimum number of symbol blocks of the first PPDU that are needed is equal to 7. According to Faster Pipeline, a minimum number of symbol blocks of the first PPDU that are needed is equal to 6.

When the A-PPDU is transmitted in an EDMG Single Carrier (SC) mode, a symbol block of the first data field may be an SC symbol block, and a minimum number of symbol blocks of the first PPDU ($N_{APPDU}$_BLKSmin) may be configured based on an EDMG_FIRST_PPDU_MIN_SC_BLOCKS value of a TXVECTOR parameter.

When the A-PPDU is transmitted in an EDMG Orthogonal Frequency Division Multiplexing (OFDM) mode, a symbol block of the first data field may be an OFDM symbol block, and the minimum number of symbol blocks of the first PPDU ($N_{APPDU}$_SYMSmin) may be configured based on first to fourth values.

The first value may be a value of the EDMG_FIRST_PPDU_MIN_SC_BLOCKS. The second value may be an SC Inverse Discrete Fourier Transform/Discrete Fourier Transform (IDFT/DFT) period. The third value may be an OFDM IDFT/DFT period. And, the fourth value may be a guard interval (GI) duration of the first and second PPDUs.

At this point, a value of the EDMG_FIRST_PPDU_MIN_SC_BLOCKS may be negotiated based on EDMG Capabilities elements, or determined as a fixed value, or configured as an EDMG_BRP_MIN_SC_BLOCKS value of the TXVECTOR parameter.

The L-Header field may include information on a length of the first PPDU. And, the first EDMG Header field may include information on a type of the GI.

Since zero padding has been performed on the first PPDU, the receiving STA may receive the second EDMG Header field of the second PPDU after obtaining length information and GI type information of the first PPDU. According to the embodiment, the receiving STA may delay (or postpone) a reception time point of the second EDMG Header field and may secure the length information and GI type information of the first PPDU by decoding the L-Header field and the first EDMG Header field.

At this point, the receiving STA may perform Frequency Domain Equalizer (FDE) per duration for the A-PPDU. The duration may be determined based on an FFT window size. The duration may have a size that is equivalent to a multiple of 512 chips (samples) according to 512 FFT.

When zero padding is not performed on the first PPDU, since a size (GI) of previous chips (samples) apart from an FFT window size for the second EDMG-Header field and a size of last chips (samples) within the FFT window size are not the same, the cyclic property is not satisfied. If the cyclic property is not satisfied, the receiving STA cannot perform FDE on the second EDMG-Header field.

However, according to the present embodiment, based on a minimum number of symbol blocks of the first PPDU, since zero padding is inserted in the first data field, a minimum number of symbol blocks may be secured based on a decoding pipeline (phase compensation, FFT, Equalizer, IFFT, Demapping&combining, LDPC, CRC and Decoding, Overhead) of the receiver. Thus, the receiving STA may obtain length information and GI type information of the first PPDU and may, then, be capable of adjusting a starting point of an FFT window. That is, the receiving STA may delay (or postpone) a receive starting point of the second EDMG Header to a time point after securing the length information and GI type information of the first PPDU. Thus, a cyclic property of the second EDMG-Header field may be satisfied based on the first data field having zero padding inserted therein. Since the cyclic property is satisfied, the receiving STA may perform FDE on the second EDMG-Header field.

The A-PPDU may be transmitted through a 2.16 GHz channel or 2.16+2.16 GHz channel ($N_{CB}$=1). And, the transmitting STA and the receiving STA may support one space-time stream ($N_{STS}$=1).

Figure 42:
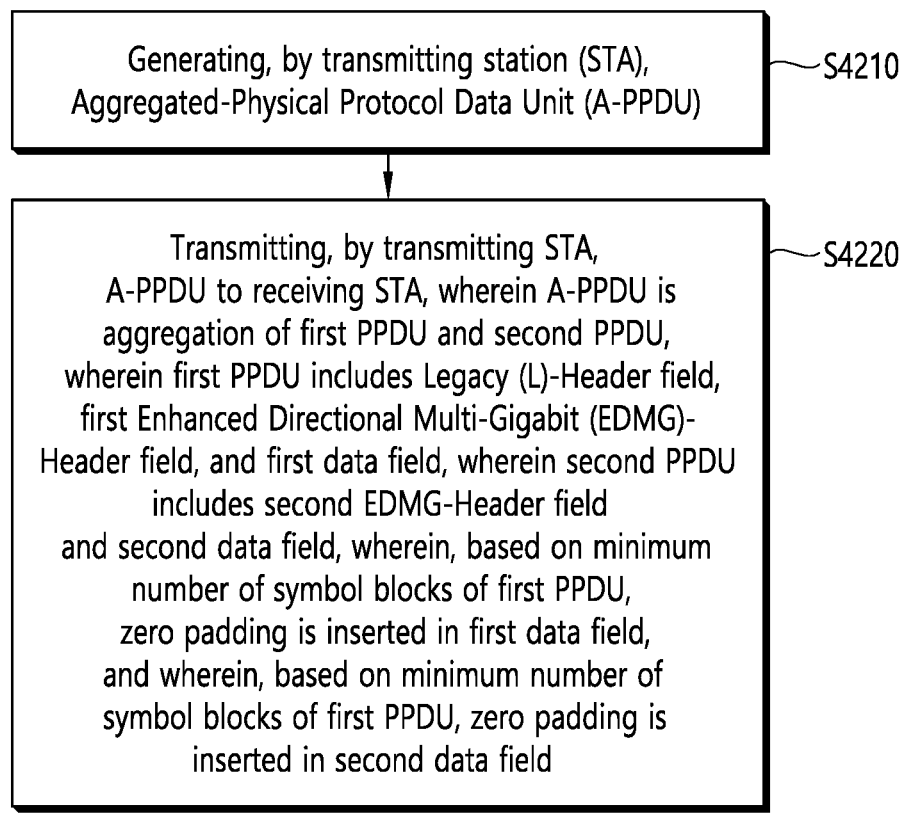
FIG. 42 is a flowchart showing a procedure of transmitting an A-PPDU by a transmitting STA according to the present embodiment.

FIG. 42 is a flowchart showing a procedure of transmitting an A-PPDU by a transmitting STA according to the present embodiment.

The present embodiment proposes a method of ensuring a minimum number of symbol blocks in an A-PPDU of an 802.11ay system and generating an A-PPDU. This is because, when a GI of a legacy part (non-EDMG portion) and a GI of an EDMG part (EDMG portion) are different, since an FFT window of a receiver becomes different, there lies a problem in that FDE cannot be performed. The present embodiment proposes a method for resolving the above-described problem.

Firstly, the terms will be described as follows. An A-PPDU may correspond to an Enhanced Directional Multi-Gigabit (EDMG) PPDU, which is defined in the 802.11 ay system. The transmitting STA may be an access point (AP) or a wireless audio/video (AV) apparatus (or device). The receiving STA may be a station (STA) or a wireless audio/video (AV) apparatus (or device). The wireless AV apparatus may be a main body device (set-top box, display device (TV), a remote controller device (remote).

In step S4210, the transmitting station (STA) generates an Aggregated-Physical Protocol Data Unit (A-PPDU).

In step S4220, the transmitting STA transmits the A-PPDU to a receiving STA.

The A-PPDU is an aggregation of a first PPDU and a second PPDU. The A-PPDU is generated by aggregating n number of EDMG PPDUs. And, although the present embodiment describes a case where n=2, the present disclosure will not always be limited to this.

The first PPDU includes a Legacy (L)-Header field, a first Enhanced Directional Multi-Gigabit (EDMG)-Header field, and a first data field.

The second PPFU includes a second EDMG-Header field and a second data field.

A GI may be inserted at both ends of the first and second data fields. Types of the GI may include a short GI, a normal GI, and a long GI.

The short GI may be generated based on a golay sequence having a length of 32. The normal GI may be generated based on a golay sequence having a length of 64. And, the long GI may be generated based on a golay sequence having a length of 128.

A GI that is inserted in the L-Header field may be generated based on a golay sequence having a length of 64. Accordingly, a length of a GI that is inserted in the L-Header field may be different from a length of a GI that is inserted in the first and second data fields. When GI lengths are different, a problem may occur in that the receiving STA cannot perform FDE due to a difference in the FFT window. The present embodiment proposes a method for resolving the above-described problems by adjusting a starting point of the FFT window of the receiving STA by extending a length of the first or second PPDU by adding zero padding or dummy value to each PPDU of the A-PPDU.

Based on the minimum number of symbol blocks of the first PPDU, zero padding is inserted in the first data field. More specifically, a number of symbol blocks in the first data field having zero padding inserted therein may be configured to be equal to the minimum number of symbol blocks of the first PPDU.

Additionally, based on the minimum number of symbol blocks of the first PPDU, zero padding is inserted in the second data field. More specifically, a number of symbol blocks in the second data field having zero padding inserted therein may be configured to be equal to the minimum number of symbol blocks of the first PPDU.

That is, by performing zero padding on the first or second PPDU, the present embodiment proposes a method for setting a number of symbol blocks to a minimum number of symbol blocks of the first and second PPDUs.

According to a Simple Pipeline, a minimum number of symbol blocks of the first PPDU that are needed is equal to 7. According to Faster Pipeline, a minimum number of symbol blocks of the first PPDU that are needed is equal to 6.

When the A-PPDU is transmitted in an EDMG Single Carrier (SC) mode, a symbol block of the first or second data field may be an SC symbol block, and a number of symbol blocks of the first or second PPDU may be configured based on an EDMG_APPDU_MIN_SC_BLOCKS value of a TXVECTOR parameter.

When the A-PPDU is transmitted in an EDMG Orthogonal Frequency Division Multiplexing (OFDM) mode, a symbol block of the first or second data field may be an OFDM symbol block, and the minimum number of symbol blocks of the first or second PPDU ($N_{APPDU\_SYMSmin}$) may be configured based on first to fourth values.

The first value may be a value of the EDMG_APPDU_MIN_SC_BLOCKS. The second value may be an SC Inverse Discrete Fourier Transform/Discrete Fourier Transform (IDFT/DFT) period. The third value may be an OFDM IDFT/DFT period. And, the fourth value may be a guard interval (GI) duration of the first and second PPDUs.

At this point, a value of the EDMG_APPDU_MIN_SC_BLOCKS may be negotiated based on EDMG Capabilities elements, or determined as a fixed value, or configured as an EDMG_BRP_MIN_SC_BLOCKS value of the TXVECTOR parameter.

The L-Header field may include information on a length of the first PPDU. And, the first EDMG Header field may include information on a type of the GI.

Since zero padding has been performed on the first PPDU, the receiving STA may receive the second EDMG Header field of the second PPDU after obtaining length information and GI type information of the first PPDU. According to the embodiment, the receiving STA may delay (or postpone) a reception time point of the second EDMG Header field and may secure the length information and GI type information of the first PPDU by decoding the L-Header field and the first EDMG Header field.

At this point, the receiving STA may perform Frequency Domain Equalizer (FDE) per duration for the A-PPDU. The duration may be determined based on an FFT window size. The duration may have a size that is equivalent to a multiple of 512 chips (samples) according to 512 FFT.

When zero padding is not performed on the first PPDU, since a size (GI) of previous chips (samples) apart from an FFT window size for the second EDMG-Header field and a size of last chips (samples) within the FFT window size are not the same, the cyclic property is not satisfied. If the cyclic property is not satisfied, the receiving STA cannot perform FDE on the second EDMG-Header field.

However, according to the present embodiment, based on a minimum number of symbol blocks of the first PPDU, since zero padding is inserted in the first data field, a minimum number of symbol blocks may be secured based on a decoding pipeline (phase compensation, FFT, Equalizer, IFFT, Demapping&combining, LDPC, CRC and Decoding, Overhead) of the receiver. Thus, the receiving STA may obtain length information and GI type information of the first PPDU and may, then, be capable of adjusting a starting point of an FFT window. That is, the receiving STA may delay (or postpone) a receive starting point of the second EDMG Header to a time point after securing the length information and GI type information of the first PPDU. Thus, a cyclic property of the second EDMG-Header field may be satisfied based on the first data field having zero padding inserted therein. Since the cyclic property is satisfied, the receiving STA may perform FDE on the second EDMG-Header field.

The A-PPDU may be transmitted through a 2.16 GHz channel or 2.16+2.16 GHz channel ($N_{CB}=1$). And, the transmitting STA and the receiving STA may support one space-time stream ($N_{STS}=1$).

Figure 43:
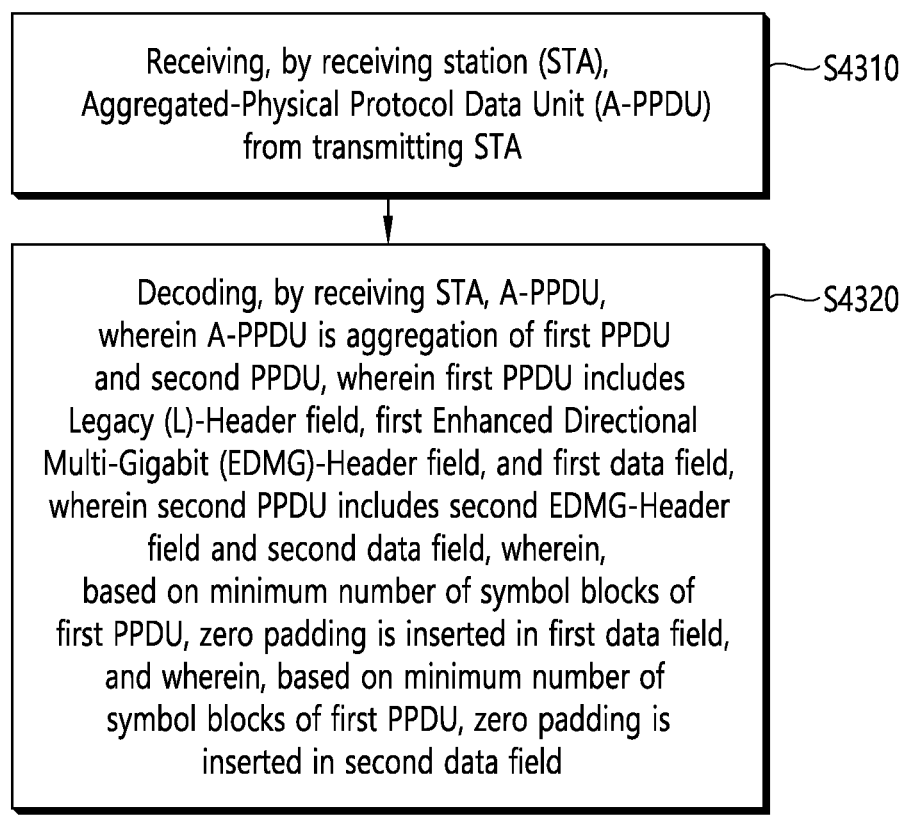
FIG. 43 is a flowchart showing a procedure of receiving an A-PPDU by a receiving STA according to the present embodiment.

FIG. 43 is a flowchart showing a procedure of receiving an A-PPDU by a receiving STA according to the present embodiment.

The present embodiment proposes a method of ensuring a minimum number of symbol blocks in an A-PPDU of an 802.11 ay system and generating an A-PPDU. This is because, when a GI of a legacy part (non-EDMG portion) and a GI of an EDMG part (EDMG portion) are different, since an FFT window of a receiver becomes different, there lies a problem in that FDE cannot be performed. The present embodiment proposes a method for resolving the above-described problem.

Firstly, the terms will be described as follows. An A-PPDU may correspond to an Enhanced Directional Multi-Gigabit (EDMG) PPDU, which is defined in the 802.11 ay system. The transmitting STA may be an access point (AP) or a wireless audio/video (AV) apparatus (or device). The receiving STA may be a station (STA) or a wireless audio/ video (AV) apparatus (or device). The wireless AV apparatus may be a main body device (set-top box, display device (TV), a remote controller device (remote).

In step S4310, a receiving station (STA) receives an Aggregated-Physical Protocol Data Unit (A-PPDU) from a transmitting STA.

In step S4320, the receiving STA decodes the A-PPDU.

The A-PPDU is an aggregation of a first PPDU and a second PPDU. The A-PPDU is generated by aggregating n number of EDMG PPDUs. And, although the present embodiment describes a case where n=2, the present disclosure will not always be limited to this.

The first PPDU includes a Legacy (L)-Header field, a first Enhanced Directional Multi-Gigabit (EDMG)-Header field, and a first data field.

The second PPFU includes a second EDMG-Header field and a second data field.

A GI may be inserted at both ends of the first and second data fields. Types of the GI may include a short GI, a normal GI, and a long GI.

The short GI may be generated based on a golay sequence having a length of 32. The normal GI may be generated based on a golay sequence having a length of 64. And, the long GI may be generated based on a golay sequence having a length of 128.

A GI that is inserted in the L-Header field may be generated based on a golay sequence having a length of 64. Accordingly, a length of a GI that is inserted in the L-Header field may be different from a length of a GI that is inserted in the first and second data fields. When GI lengths are different, a problem may occur in that the receiving STA cannot perform FDE due to a difference in the FFT window. The present embodiment proposes a method for resolving the above-described problems by adjusting a starting point of the FFT window of the receiving STA by extending a length of the first or second PPDU by adding zero padding or dummy value to each PPDU of the A-PPDU.

Based on the minimum number of symbol blocks of the first PPDU, zero padding is inserted in the first data field. More specifically, a number of symbol blocks in the first data field having zero padding inserted therein may be configured to be equal to the minimum number of symbol blocks of the first PPDU.

Additionally, based on the minimum number of symbol blocks of the first PPDU, zero padding is inserted in the second data field. More specifically, a number of symbol blocks in the second data field having zero padding inserted therein may be configured to be equal to the minimum number of symbol blocks of the first PPDU.

That is, by performing zero padding on the first or second PPDU, the present embodiment proposes a method for setting a number of symbol blocks to a minimum number of symbol blocks of the first and second PPDUs.

According to a Simple Pipeline, a minimum number of symbol blocks of the first PPDU that are needed is equal to 7. According to Faster Pipeline, a minimum number of symbol blocks of the first PPDU that are needed is equal to 6.

When the A-PPDU is transmitted in an EDMG Single Carrier (SC) mode, a symbol block of the first or second data field may be an SC symbol block, and a number of symbol blocks of the first or second PPDU may be configured based on an EDMG_APPDU_MIN_SC_BLOCKS value of a TXVECTOR parameter.

When the A-PPDU is transmitted in an EDMG Orthogonal Frequency Division Multiplexing (OFDM) mode, a symbol block of the first or second data field may be an OFDM symbol block, and the minimum number of symbol blocks of the first or second PPDU ($N_{APPDU\_SYMSmin}$) may be configured based on first to fourth values.

The first value may be a value of the EDMG_APPDU_MIN_SC_BLOCKS. The second value may be an SC Inverse Discrete Fourier Transform/Discrete Fourier Transform (IDFT/DFT) period. The third value may be an OFDM IDFT/DFT period. And, the fourth value may be a guard interval (GI) duration of the first and second PPDUs.

At this point, a value of the EDMG_APPDU_MIN_SC_BLOCKS may be negotiated based on EDMG Capabilities elements, or determined as a fixed value, or configured as an EDMG_BRP_MIN_SC_BLOCKS value of the TXVECTOR parameter.

The L-Header field may include information on a length of the first PPDU. And, the first EDMG Header field may include information on a type of the GI.

Since zero padding has been performed on the first PPDU, the receiving STA may receive the second EDMG Header field of the second PPDU after obtaining length information and GI type information of the first PPDU. According to the embodiment, the receiving STA may delay (or postpone) a reception time point of the second EDMG Header field and may secure the length information and GI type information of the first PPDU by decoding the L-Header field and the first EDMG Header field.

At this point, the receiving STA may perform Frequency Domain Equalizer (FDE) per duration for the A-PPDU. The duration may be determined based on an FFT window size. The duration may have a size that is equivalent to a multiple of 512 chips (samples) according to 512 FFT.

When zero padding is not performed on the first PPDU, since a size (GI) of previous chips (samples) apart from an FFT window size for the second EDMG-Header field and a size of last chips (samples) within the FFT window size are not the same, the cyclic property is not satisfied. If the cyclic property is not satisfied, the receiving STA cannot perform FDE on the second EDMG-Header field.

However, according to the present embodiment, based on a minimum number of symbol blocks of the first PPDU, since zero padding is inserted in the first data field, a minimum number of symbol blocks may be secured based on a decoding pipeline (phase compensation, FFT, Equalizer, IFFT, Demapping&combining, LDPC, CRC and Decoding, Overhead) of the receiver. Thus, the receiving STA may obtain length information and GI type information of the first PPDU and may, then, be capable of adjusting a starting point of an FFT window. That is, the receiving STA may delay (or postpone) a receive starting point of the second EDMG Header to a time point after securing the length information and GI type information of the first PPDU. Thus, a cyclic property of the second EDMG-Header field may be satisfied based on the first data field having zero padding inserted therein. Since the cyclic property is satisfied, the receiving STA may perform FDE on the second EDMG-Header field.

The A-PPDU may be transmitted through a 2.16 GHz channel or 2.16+2.16 GHz channel ($N_{CB}$=1). And, the transmitting STA and the receiving STA may support one space-time stream ($N_{STS}$=1).

5. Device Configuration

Figure 44:
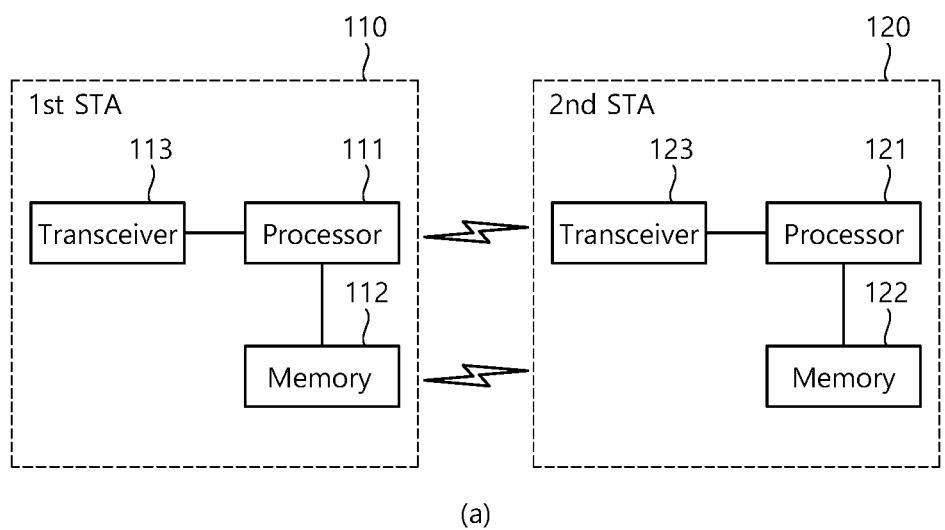
FIG. 44 shows an example of a transmitting apparatus and/or a receiving apparatus according to the present disclosure.
Figure 44:
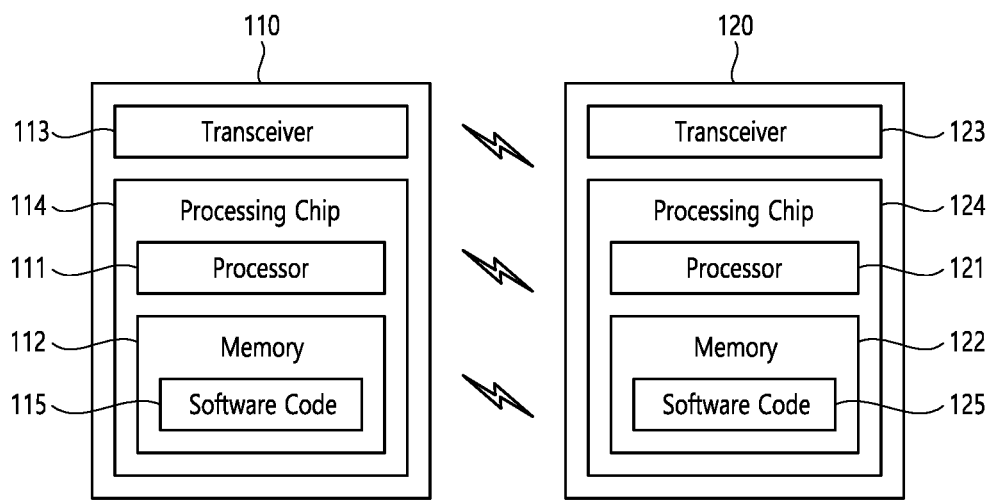

FIG. 44 shows an example of a transmitting apparatus and/or a receiving apparatus according to the present disclosure.

In the example of FIG. 44, various technical features described below may be performed. FIG. 44 relates to at least one station (STA). For example, STAs 110 and 120 of the present disclosure may also be referred to by using various terms such as a mobile terminal, a wireless device, a wireless transmit/receive unit (WTRU), a user equipment (UE), a mobile station (MS), a mobile subscriber unit, or simply a user. The STAs 110 and 120 of the present disclosure may also be referred to by using various terms such as a network, a base station, a node-B, an access point (AP), a repeater, a router, a relay, and so on. The STAs 110 and 120 of the present disclosure may also be referred to by using various names such as a receiving apparatus, a transmitting apparatus, a receiving STA, a transmitting STA, a receiving device, a transmitting device, and so on.

For example, the STAs 110 and 120 may function as an access point (AP) or a non-AP. That is, the STAs 110 and 120 of the present disclosure may perform the functions of an AP and/or a non-AP. In this specification, the AP may also be indicated as an AP STA.

The STAs 110 and 120 of the present disclosure may support various communication standards together in addition to the IEEE 802.11 standard. For example, a communication standard (e.g., LTE, LTE-A, 5G NR standard), or the like, according to the 3GPP standard may be supported. Additionally, the STA of the present disclosure may be implemented as various devices such as a mobile phone, a vehicle, a personal computer, and so on. Moreover, the STA of the present disclosure may support communication for various communication services such as voice calls, video calls, data communication, and self-driving (autonomous-driving), and so on.

The STAs 110 and 120 of the present disclosure may include a medium access control (MAC) conforming to the IEEE 802.11 standard and a physical layer interface for a wireless (or radio) medium.

The STA 110 and 120 will hereinafter be described based on sub-drawing (a) of FIG. 44.

The first STA 110 may include a processor 111, a memory 112, and a transceiver 113. The illustrated process, memory, and transceiver may be implemented individually as separate chips, or at least two blocks/functions may be implemented in a single chip.

The transceiver 113 of the first STA performs a signal transmission/reception operation. More specifically, an IEEE 802.11 packet (e.g., IEEE 802.11a/b/g/n/ac/ax/be, and so on) may be transmitted/received.

For example, the first STA 110 may perform an operation intended by an AP. For example, the processor 111 of the AP may receive a signal through the transceiver 113, process a reception (RX) signal, generate a transmission (TX) signal, and provide control for signal transmission. The memory 112 of the AP may store a signal (e.g., RX signal) received through the transceiver 113, and may store a signal (e.g., TX signal) to be transmitted through the transceiver.

For example, the second STA 120 may perform an operation intended by a non-AP STA. For example, a transceiver 123 of a non-AP performs a signal transmission/reception operation. Specifically, an IEEE 802.11 packet (e.g., IEEE 802.11a/b/g/n/ac/ax/be packet, and so on) may be transmitted/received.

For example, a processor 121 of the non-AP STA may receive a signal through the transceiver 123, process an RX signal, generate a TX signal, and provide control for signal transmission. A memory 122 of the non-AP STA may store a signal (e.g., RX signal) received through the transceiver 123, and may store a signal (e.g., TX signal) that is to be transmitted through the transceiver.

For example, an operation of an apparatus (or device) indicated as an AP in the specification described below may be performed by the first STA 110 or the second STA 120. For example, if the first STA 110 is the AP, the operation of the apparatus (or device) indicated as the AP may be controlled by the processor 111 of the first STA 110, and a related signal may be transmitted or received through the transceiver 113, which is controlled by the processor 111 of the first STA 110. And, control information related to the operation of the AP or a TX/RX signal of the AP may be stored in the memory 112 of the first STA 110. In addition, if the second STA 120 is the AP, the operation of the apparatus (or device) indicated as the AP may be controlled by the processor 121 of the second STA 120, and a related signal may be transmitted or received through the transceiver 123, which is controlled by the processor 121 of the second STA 120. And, control information related to the operation of the AP or a TX/RX signal of the AP may be stored in the memory 122 of the second STA 120.

For example, in the specification described below, an operation of an apparatus (or device) indicated as a non-AP (or user-STA) may be performed in the first STA 110 or the second STA 120. For example, if the second STA 120 is the non-AP, the operation of the apparatus (or device) indicated as the non-AP may be controlled by the processor 121 of the second STA 120, and a related signal may be transmitted or received through the transceiver 123, which is controlled by the processor 121 of the second STA 120. In addition, control information related to the operation of the non-AP or a TX/RX signal of the non-AP may be stored in the memory 122 of the second STA 120. For example, if the first STA 110 is the non-AP, the operation of the apparatus (or device) indicated as the non-AP may be controlled by the processor 111 of the first STA 110, and a related signal may be transmitted or received through the transceiver 113, which is controlled by the processor 111 of the first STA 110. In addition, control information related to the operation of the non-AP or a TX/RX signal of the non-AP may be stored in the memory 112 of the first STA 110.

In the specification described below, a device (or apparatus) being referred to as a (transmitting/receiving) STA, a first STA, a second STA, an STA1, an STA2, an AP, a first AP, a second AP, an AP1, an AP2, a (transmitting/receiving) terminal, a (transmitting/receiving) device, a (transmitting/receiving) apparatus, a network, and so on, may imply the STAs 110 and 120 of FIG. 44. For example, a device (or apparatus) indicated, without any specific reference numeral, as the (transmitting/receiving) STA, the first STA, the second STA, the STA1, the STA2, the AP, the first AP, the second AP, the AP1, the AP2, the (transmitting/receiving) terminal, the (transmitting/receiving) device, the (transmitting/receiving) apparatus, the network, and so on, may imply the STAs 110 and 120 of FIG. 44. For example, in the following example, an operation in which various STAs transmit/receive a signal (e.g., a PPDU) may be performed in the transceivers 113 and 123 of FIG. 44. In addition, in the following example, an operation in which various STAs generate a TX/RX signal or perform data processing and computation in advance for the TX/RX signal may be performed in the processors 111 and 121 of FIG. 44. For example, an example of an operation for generating the TX/RX signal or performing the data processing and computation in advance may include: 1) an operation of determining/obtaining/configuring/computing/decoding/encoding bit information of a sub-field (SIG, STF, LTF, Data)

included in a PPDU; 2) an operation of determining/configuring/obtaining a time resource or frequency resource (e.g., a subcarrier resource), and so on, used for the sub-field (SIG, STF, LTF, Data) included the PPDU; 3) an operation of determining/configuring/obtaining a specific sequence (e.g., a pilot sequence, an STF/LTF sequence, an extra sequence applied to SIG), and so on, used for the sub-field (SIG, STF, LTF, Data) field included in the PPDU; 4) a power control operation and/or power saving operation applied for the STA; and 5) an operation related to determining/obtaining/configuring/decoding/encoding, and so on, of an ACK signal. Additionally, in the following example, a variety of information used by various STAs for determining/obtaining/configuring/computing/decoding/decoding a TX/RX signal (e.g., information related to a field/subfield/control field/parameter/power, and so on) may be stored in the memories 112 and 122 of FIG. 44.

The above-described device/STA of sub-drawing (a) of FIG. 44 may be modified as shown in sub-drawing (b) of FIG. 44. Hereinafter, the STA 110 and 120 of the present disclosure will be described based on sub-drawing (b) of FIG. 44.

For example, the transceiver 113 and 123 shown in sub-drawing (b) of FIG. 44 may perform the same functions as the transceiver shown in sub-drawing (a) of FIG. 44. For example, a processing chip 114 and 124 shown in sub-drawing (b) of FIG. 44 may include a processor 111 and 121 and a memory 112 and 122. The processor 111 and 121 and the memory 112 and 122 shown in sub-drawing (b) of FIG. 44 may perform the same functions as the processor 111 and 121 and the memory 112 and 122 shown in the above-described sub-drawing (a) of FIG. 44.

In the specification described below, a mobile terminal, a wireless device, a wireless transmit/receive unit (WTRU), a user equipment (UE), a mobile station (MS), a mobile subscriber unit, a user, a user STA, a network, a base station, a Node-B, an access point (AP), a repeater, a router, a relay, a receiving device, a transmitting device, a receiving STA, a transmitting STA, a receiving apparatus, and/or a transmitting apparatus may mean an STA 110 and 120 shown in sub-drawings (a)/(b) of FIG. 44, or may mean a processing chip 114 and 124 shown in sub-drawing (b) of FIG. 44. For example, the technical feature of the transmitting STA transmitting a control signal may be understood as a technical feature of a control signal, which is generated in the processor 111 and 121 shown in sub-drawings (a)/(b) of FIG. 44, being transmitted through the transceiver 113 and 123 shown in sub-drawings (a)/(b) of FIG. 44. Alternatively, the technical feature of the transmitting STA transmitting a control signal may be understood as a technical feature of a control signal, which is to be delivered (or transported) to the transceiver 113 and 123, being generated in the processing chip 114 and 124 shown in sub-drawing (b) of FIG. 44.

For example, the technical feature of the receiving STA receiving a control signal may be understood as a technical feature of a control signal being received by the transceiver 113 and 123 shown in sub-drawing (a) of FIG. 44. Alternatively, the technical feature of the receiving STA receiving a control signal may be understood as a technical feature of a control signal, which is received by the transceiver 113 and 123 shown in sub-drawing (a) of FIG. 44, being obtained by the processor 111 and 121 shown in sub-drawing (a) of FIG. 44. Alternatively, the technical feature of the receiving STA receiving a control signal may be understood as a technical feature of a control signal, which is received by the transceiver 113 and 123 shown in sub-drawing (b) of FIG. 44, being obtained by the processing chip 114 and 124 shown in sub-drawing (b) of FIG. 44.

Referring to sub-drawing (b) of FIG. 44, a software code 115 and 125 may be included in the memory 112 and 122. The software code 115 and 125 may include instructions controlling the operations of the processor 111 and 121. The software code 115 and 125 may be included in various programming languages.

The processor 111 and 121 or processing chip 114 and 124 shown in FIG. 44 may include application-specific integrated circuit (ASIC), other chipset, logic circuit and/or data processing device. The processor 610 may be an application processor (AP). For example, the processor 111 and 121 or processing chip 114 and 124 shown in FIG. 44 may include at least one of a digital signal processor (DSP), a central processing unit (CPU), a graphics processing unit (GPU), a modem (modulator and demodulator). For example, the processor 111 and 121 or processing chip 114 and 124 shown in FIG. 44 may be found in SNAPDRAGON™ series of processors made by Qualcomm®, EXYNOS™ series of processors made by Samsung®, a series of processors made by Apple®, HELIO™ series of processors made by MediaTek®, ATOM™ series of processors made by Intel®, or may be an enhanced version of such processor(s) (or a corresponding next generation processor).

In the present disclosure, an uplink may mean a link that is established for a communication from a non-AP STA to an AP STA. And, an uplink PPDU/packet/signal, and so on, may be transmitted through the uplink. Additionally, in the present disclosure, a downlink may mean a link that is established for a communication from an AP STA to a non-AP STA. And, a downlink PPDU/packet/signal, and so on, may be transmitted through the downlink.

Figure 45:
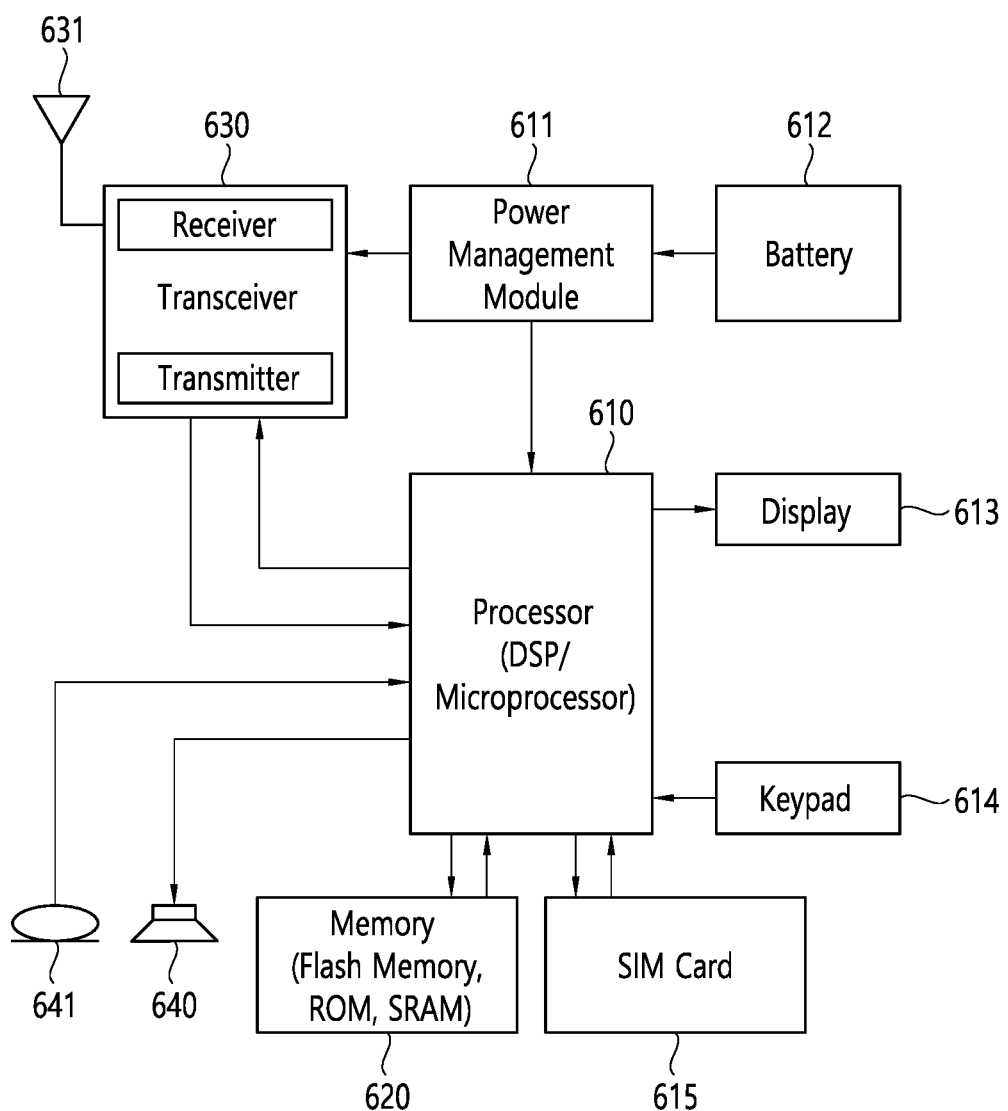
FIG. 45 shows a modified example of a transmitting apparatus and/or a receiving apparatus according to the present disclosure.

FIG. 45 shows a modified example of a transmitting apparatus and/or a receiving apparatus according to the present disclosure.

Each apparatus (or device)/STA shown in sub-drawings (a)/(b) of FIG. 44 may be modified as shown in FIG. 45. A transceiver 630 of FIG. 45 may be the same as the transceiver 113 and 123 of FIG. 44. The transceiver 630 of FIG. 45 may include a receiver and a transmitter.

A processor 610 of FIG. 45 may be the same as the processor 111 and 121 of FIG. 44. Alternatively, the processor 610 of FIG. 45 may be the same as the processing chip 114 and 124 of FIG. 44.

A memory 620 of FIG. 45 may be the same as the memory 112 and 122 of FIG. 44. Alternatively, the memory 620 of FIG. 45 may be a separate external memory, which is different from the memory 112 and 122 of FIG. 44.

Referring to FIG. 45, a power management module 611 manages power for the processor 610 and/or the transceiver 630. A battery 612 supplies power to the power management module 611. A display 613 outputs processing results performed by the processor 610. A keypad 614 receives input that is to be used by the processor 610. The keypad 614 may be indicated (or displayed) on the display 613. A SIM card 615 is an integrated circuit that is intended to securely store the international mobile subscriber identity (IMSI) number and its related key, which are used to identify and authenticate subscribers on mobile telephony devices (such as mobile phones and computers).

Referring to FIG. 45, a speaker 640 outputs sound-related results processed by the processor 610. A microphone 641 receives sound-related inputs to be used by the processor 610.

The technical features of the above-described present disclosure may be applied to various apparatuses (or devices) and methods. For example, the above-described technical features of the present disclosure may be performed/supported by the apparatus (or device) of FIG. 44 and/or FIG. 45. For example, the above-described technical features of the present disclosure may be applied only to part of FIG. 44 and/or FIG. 45. For example, the above-described technical features of the present disclosure may be implemented based the processing chip 114 and 124 of FIG. 44, or may be implemented based on the processor 111 and 121 and the memory 112 and 122 of FIG. 44, or may be implemented based on the processor 610 and the memory 620 of FIG. 45. For example, the device of the present disclosure is a device that transmits/receives an Extremely High Throughput Physical Protocol Data Unit (EHT PPDU), and the device may include a memory, and a processor being operatively connected to the memory, wherein the processor may generate an A-PPDU and transmit the generated A-PPDU to a receiving STA, or may receive an A-PPDU from a transmitting STA and decode the received A-PPDU.

The A-PPDU is an aggregation of a first PPDU and a second PPDU. The A-PPDU is generated by aggregating n number of EDMG PPDUs. And, although the present embodiment describes a case where n=2, the present disclosure will not always be limited to this.

The first PPDU includes a Legacy (L)-Header field, a first Enhanced Directional Multi-Gigabit (EDMG)-Header field, and a first data field.

The second PPFU includes a second EDMG-Header field and a second data field.

A GI may be inserted at both ends of the first and second data fields. Types of the GI may include a short GI, a normal GI, and a long GI.

The short GI may be generated based on a golay sequence having a length of 32. The normal GI may be generated based on a golay sequence having a length of 64. And, the long GI may be generated based on a golay sequence having a length of 128.

A GI that is inserted in the L-Header field may be generated based on a golay sequence having a length of 64. Accordingly, a length of a GI that is inserted in the L-Header field may be different from a length of a GI that is inserted in the first and second data fields. When GI lengths are different, a problem may occur in that the receiving STA cannot perform FDE due to a difference in the FFT window. The present embodiment proposes a method for resolving the above-described problems by adjusting a starting point of the FFT window of the receiving STA by extending a length of the first PPDU by adding zero padding or dummy value to the first PPDU.

Based on the minimum number of symbol blocks of the first PPDU, zero padding is inserted in the first data field. More specifically, a number of symbol blocks in the first data field having zero padding inserted therein may be configured to be equal to the minimum number of symbol blocks of the first PPDU. That is, by performing zero padding on the first PPDU, the present embodiment proposes a method for setting a number of symbol blocks to a minimum number of symbol blocks of the first PPDU.

According to a Simple Pipeline, a minimum number of symbol blocks of the first PPDU that are needed is equal to 7. According to Faster Pipeline, a minimum number of symbol blocks of the first PPDU that are needed is equal to 6.

When the A-PPDU is transmitted in an EDMG Single Carrier (SC) mode, a symbol block of the first data field may be an SC symbol block, and a minimum number of symbol blocks of the first PPDU ($N_{APPDU\_}$BLKSmin) may be configured based on an EDMG_FIRST_PPDU_MIN_SC_BLOCKS value of a TXVECTOR parameter.

When the A-PPDU is transmitted in an EDMG Orthogonal Frequency Division Multiplexing (OFDM) mode, a symbol block of the first data field may be an OFDM symbol block, and the minimum number of symbol blocks of the first PPDU ($N_{APPDU\_}$SYMSmin) may be configured based on first to fourth values.

The first value may be a value of the EDMG_FIRST_PPDU_MIN_SC_BLOCKS. The second value may be an SC Inverse Discrete Fourier Transform/Discrete Fourier Transform (IDFT/DFT) period. The third value may be an OFDM IDFT/DFT period. And, the fourth value may be a guard interval (GI) duration of the first and second PPDUs.

At this point, a value of the EDMG_FIRST_PPDU_MIN_SC_BLOCKS may be negotiated based on EDMG Capabilities elements, or determined as a fixed value, or configured as an EDMG_BRP_MIN_SC_BLOCKS value of the TXVECTOR parameter.

The L-Header field may include information on a length of the first PPDU. And, the first EDMG Header field may include information on a type of the GI.

Since zero padding has been performed on the first PPDU, the receiving STA may receive the second EDMG Header field of the second PPDU after obtaining length information and GI type information of the first PPDU. According to the embodiment, the receiving STA may delay (or postpone) a reception time point of the second EDMG Header field and may secure the length information and GI type information of the first PPDU by decoding the L-Header field and the first EDMG Header field.

At this point, the receiving STA may perform Frequency Domain Equalizer (FDE) per duration for the A-PPDU. The duration may be determined based on an FFT window size. The duration may have a size that is equivalent to a multiple of 512 chips (samples) according to 512 FFT.

When zero padding is not performed on the first PPDU, since a size (GI) of previous chips (samples) apart from an FFT window size for the second EDMG-Header field and a size of last chips (samples) within the FFT window size are not the same, the cyclic property is not satisfied. If the cyclic property is not satisfied, the receiving STA cannot perform FDE on the second EDMG-Header field.

However, according to the present embodiment, based on a minimum number of symbol blocks of the first PPDU, since zero padding is inserted in the first data field, a minimum number of symbol blocks may be secured based on a decoding pipeline (phase compensation, FFT, Equalizer, IFFT, Demapping&combining, LDPC, CRC and Decoding, Overhead) of the receiver. Thus, the receiving STA may obtain length information and GI type information of the first PPDU and may, then, be capable of adjusting a starting point of an FFT window. That is, the receiving STA may delay (or postpone) a receive starting point of the second EDMG Header to a time point after securing the length information and GI type information of the first PPDU. Thus, a cyclic property of the second EDMG-Header field may be satisfied based on the first data field having zero padding inserted therein. Since the cyclic property is satisfied, the receiving STA may perform FDE on the second EDMG-Header field.

The A-PPDU may be transmitted through a 2.16 GHz channel or 2.16+2.16 GHz channel ($N_{CB}$=1). And, the transmitting STA and the receiving STA may support one space-time stream ($N_{STS}$=1).

The technical features of the present disclosure may be implemented based on a computer readable medium (CRM). For example, the CRM that is proposed in the present disclosure is at least one computer readable medium including an instruction being executed by at least one processor.

The CRM may store instructions performing operations including the steps of receiving an Extremely High Throughput Physical Protocol Data Unit (EHT PPDU) from a transmitting STA through a 320 MHz band or 160+160 MHz band, and decoding the EHT PPDU. The instructions that are stored in the CRM of the present disclosure may be executed by at least one processor. At least one processor being related to the CRM of the present disclosure may be the processor(s) 111 and 121 or processing chip(s) 114 and 124 of FIG. 44, or the processor 610 of FIG. 45. Meanwhile, the CRM of the present disclosure may be the memory(s) 112 and 122 of FIG. 44, or the memory 620 of FIG. 45, or a separate external memory/storage medium/disc, and so on. The CRM may generate an A-PPDU and transmit the generated A-PPDU to a receiving STA, or may receive an A-PPDU from a transmitting STA and decode the received A-PPDU.

The A-PPDU is an aggregation of a first PPDU and a second PPDU. The A-PPDU is generated by aggregating n number of EDMG PPDUs. And, although the present embodiment describes a case where n=2, the present disclosure will not always be limited to this.

The first PPDU includes a Legacy (L)-Header field, a first Enhanced Directional Multi-Gigabit (EDMG)-Header field, and a first data field.

The second PPFU includes a second EDMG-Header field and a second data field.

A GI may be inserted at both ends of the first and second data fields. Types of the GI may include a short GI, a normal GI, and a long GI.

The short GI may be generated based on a golay sequence having a length of 32. The normal GI may be generated based on a golay sequence having a length of 64. And, the long GI may be generated based on a golay sequence having a length of 128.

A GI that is inserted in the L-Header field may be generated based on a golay sequence having a length of 64. Accordingly, a length of a GI that is inserted in the L-Header field may be different from a length of a GI that is inserted in the first and second data fields. When GI lengths are different, a problem may occur in that the receiving STA cannot perform FDE due to a difference in the FFT window. The present embodiment proposes a method for resolving the above-described problems by adjusting a starting point of the FFT window of the receiving STA by extending a length of the first PPDU by adding zero padding or dummy value to the first PPDU.

Based on the minimum number of symbol blocks of the first PPDU, zero padding is inserted in the first data field. More specifically, a number of symbol blocks in the first data field having zero padding inserted therein may be configured to be equal to the minimum number of symbol blocks of the first PPDU. That is, by performing zero padding on the first PPDU, the present embodiment proposes a method for setting a number of symbol blocks to a minimum number of symbol blocks of the first PPDU.

According to a Simple Pipeline, a minimum number of symbol blocks of the first PPDU that are needed is equal to 7. According to Faster Pipeline, a minimum number of symbol blocks of the first PPDU that are needed is equal to 6.

When the A-PPDU is transmitted in an EDMG Single Carrier (SC) mode, a symbol block of the first data field may be an SC symbol block, and a minimum number of symbol blocks of the first PPDU ($N_{APPDU}$_BLKSmin) may be configured based on an EDMG_FIRST_PPDU_MIN_SC_BLOCKS value of a TXVECTOR parameter.

When the A-PPDU is transmitted in an EDMG Orthogonal Frequency Division Multiplexing (OFDM) mode, a symbol block of the first data field may be an OFDM symbol block, and the minimum number of symbol blocks of the first PPDU ($N_{APPDU}$_SYMSmin) may be configured based on first to fourth values.

The first value may be a value of the EDMG_FIRST_PPDU_MIN_SC_BLOCKS. The second value may be an SC Inverse Discrete Fourier Transform/Discrete Fourier Transform (IDFT/DFT) period. The third value may be an OFDM IDFT/DFT period. And, the fourth value may be a guard interval (GI) duration of the first and second PPDUs.

At this point, a value of the EDMG_FIRST_PPDU_MIN_SC_BLOCKS may be negotiated based on EDMG Capabilities elements, or determined as a fixed value, or configured as an EDMG_BRP_MIN_SC_BLOCKS value of the TXVECTOR parameter.

The L-Header field may include information on a length of the first PPDU. And, the first EDMG Header field may include information on a type of the GI.

Since zero padding has been performed on the first PPDU, the receiving STA may receive the second EDMG Header field of the second PPDU after obtaining length information and GI type information of the first PPDU. According to the embodiment, the receiving STA may delay (or postpone) a reception time point of the second EDMG Header field and may secure the length information and GI type information of the first PPDU by decoding the L-Header field and the first EDMG Header field.

At this point, the receiving STA may perform Frequency Domain Equalizer (FDE) per duration for the A-PPDU. The duration may be determined based on an FFT window size. The duration may have a size that is equivalent to a multiple of 512 chips (samples) according to 512 FFT.

When zero padding is not performed on the first PPDU, since a size (GI) of previous chips (samples) apart from an FFT window size for the second EDMG-Header field and a size of last chips (samples) within the FFT window size are not the same, the cyclic property is not satisfied. If the cyclic property is not satisfied, the receiving STA cannot perform FDE on the second EDMG-Header field.

However, according to the present embodiment, based on a minimum number of symbol blocks of the first PPDU, since zero padding is inserted in the first data field, a minimum number of symbol blocks may be secured based on a decoding pipeline (phase compensation, FFT, Equalizer, IFFT, Demapping&combining, LDPC, CRC and Decoding, Overhead) of the receiver. Thus, the receiving STA may obtain length information and GI type information of the first PPDU and may, then, be capable of adjusting a starting point of an FFT window. That is, the receiving STA may delay (or postpone) a receive starting point of the second EDMG Header to a time point after securing the length information and GI type information of the first PPDU. Thus, a cyclic property of the second EDMG-Header field may be satisfied based on the first data field having zero padding inserted therein. Since the cyclic property is satisfied, the receiving STA may perform FDE on the second EDMG-Header field.

The A-PPDU may be transmitted through a 2.16 GHz channel or 2.16+2.16 GHz channel ($N_{CB}=1$). And, the transmitting STA and the receiving STA may support one space-time stream ($N_{STS}=1$).

The foregoing technical features of the present disclosure are applicable to various applications or business models. For example, the foregoing technical features may be applied for wireless communication of a device supporting artificial intelligence (AI).

Artificial intelligence refers to a field of study on artificial intelligence or methodologies for creating artificial intelligence, and machine learning refers to a field of study on methodologies for defining and solving various issues in the area of artificial intelligence. Machine learning is also defined as an algorithm for improving the performance of an operation through steady experiences of the operation.

An artificial neural network (ANN) is a model used in machine learning and may refer to an overall problem-solving model that includes artificial neurons (nodes) forming a network by combining synapses. The artificial neural network may be defined by a pattern of connection between neurons of different layers, a learning process of updating a model parameter, and an activation function generating an output value.

The artificial neural network may include an input layer, an output layer, and optionally one or more hidden layers. Each layer includes one or more neurons, and the artificial neural network may include synapses that connect neurons. In the artificial neural network, each neuron may output a function value of an activation function of input signals input through a synapse, weights, and deviations.

A model parameter refers to a parameter determined through learning and includes a weight of synapse connection and a deviation of a neuron. A hyper-parameter refers to a parameter to be set before learning in a machine learning algorithm and includes a learning rate, the number of iterations, a mini-batch size, and an initialization function.

Learning an artificial neural network may be intended to determine a model parameter for minimizing a loss function. The loss function may be used as an index for determining an optimal model parameter in a process of learning the artificial neural network.

Machine learning may be classified into supervised learning, unsupervised learning, and reinforcement learning.

Supervised learning refers to a method of training an artificial neural network with a label given for training data, wherein the label may indicate a correct answer (or result value) that the artificial neural network needs to infer when the training data is input to the artificial neural network. Unsupervised learning may refer to a method of training an artificial neural network without a label given for training data. Reinforcement learning may refer to a training method for training an agent defined in an environment to choose an action or a sequence of actions to maximize a cumulative reward in each state.

Machine learning implemented with a deep neural network (DNN) including a plurality of hidden layers among artificial neural networks is referred to as deep learning, and deep learning is part of machine learning. Hereinafter, machine learning is construed as including deep learning.

The foregoing technical features may be applied to wireless communication of a robot.

Robots may refer to machinery that automatically process or operate a given task with own ability thereof. In particular, a robot having a function of recognizing an environment and autonomously making a judgment to perform an operation may be referred to as an intelligent robot.

Robots may be classified into industrial, medical, household, military robots and the like according uses or fields. A robot may include an actuator or a driver including a motor to perform various physical operations, such as moving a robot joint. In addition, a movable robot may include a wheel, a brake, a propeller, and the like in a driver to run on the ground or fly in the air through the driver.

The foregoing technical features may be applied to a device supporting extended reality.

Extended reality collectively refers to virtual reality (VR), augmented reality (AR), and mixed reality (MR). VR technology is a computer graphic technology of providing a real-world object and background only in a CG image, AR technology is a computer graphic technology of providing a virtual CG image on a real object image, and MR technology is a computer graphic technology of providing virtual objects mixed and combined with the real world.

MR technology is similar to AR technology in that a real object and a virtual object are displayed together. However, a virtual object is used as a supplement to a real object in AR technology, whereas a virtual object and a real object are used as equal statuses in MR technology.

XR technology may be applied to a head-mount display (HMD), a head-up display (HUD), a mobile phone, a tablet PC, a laptop computer, a desktop computer, a TV, digital signage, and the like. A device to which XR technology is applied may be referred to as an XR device.

The claims recited in the present disclosure may be combined in a variety of ways. For example, the technical features of the method claims of the present disclosure may be combined to be implemented as a device, and the technical features of the device claims of the present disclosure may be combined to be implemented by a method. In addition, the technical characteristics of the method claim of the present disclosure and the technical characteristics of the device claim may be combined to be implemented as a device, and the technical characteristics of the method claim of the present disclosure and the technical characteristics of the device claim may be combined to be implemented by a method.

What is claimed is:

1. A method in a wireless local area network (WLAN) system, comprising:
    generating, by a transmitting station (STA), an Aggregated-Physical Protocol Data Unit (A-PPDU); and
    transmitting, by the transmitting STA, the A-PPDU to a receiving STA,
    wherein the A-PPDU is an aggregation of a first PPDU and a second PPDU,
    wherein the first PPDU includes a Legacy (L)-Header field, a first Enhanced Directional Multi-Gigabit (EDMG)-Header field, and a first data field,
    wherein the second PPDU includes a second EDMG-Header field and a second data field,
    wherein, based on the minimum number of symbol blocks of the first PPDU, zero padding is inserted in the first data field,
    wherein the A-PPDU is transmitted through a 2.16 GHz channel or 2.16+2.16 GHz channel, and
    wherein the transmitting STA and the receiving STA support one space-time stream.

2. The method of claim 1, wherein a number of symbol blocks in the first data field having zero padding inserted therein is configured to be equal to the minimum number of symbol blocks of the first PPDU.

3. A transmitting station (STA) in a wireless local area network (WLAN) system, comprising:
 a memory;
 a transceiver; and
 a processor being operatively connected to the memory and the transceiver,
 wherein the processor is configured to:
 generate an Aggregated-Physical Protocol Data Unit (A-PPDU), and
 transmit the A-PPDU to a receiving STA,
 wherein the A-PPDU is an aggregation of a first PPDU and a second PPDU,
 wherein the first PPDU includes a Legacy (L)-Header field, a first Enhanced Directional Multi-Gigabit (EDMG)-Header field, and a first data field,
 wherein the second PPDU includes a second EDMG-Header field and a second data field,
 wherein, based on the minimum number of symbol blocks of the first PPDU, zero padding is inserted in the first data field,
 wherein the A-PPDU is transmitted through a 2.16 GHz channel or 2.16+2.16 GHz channel, and
 wherein the transmitting STA and the receiving STA support one space-time stream.

4. The transmitting STA of claim 3, wherein a number of symbol blocks in the first data field having zero padding inserted therein is configured to be equal to the minimum number of symbol blocks of the first PPDU.

5. A method in a wireless local area network (WLAN) system, comprising:
 receiving, by a receiving station (STA), an Aggregated-Physical Protocol Data Unit (A-PPDU) from a transmitting STA; and
 decoding, by the receiving STA, the A-PPDU,
 wherein the A-PPDU is an aggregation of a first PPDU and a second PPDU,
 wherein the first PPDU includes a Legacy (L)-Header field, a first Enhanced Directional Multi-Gigabit (EDMG)-Header field, and a first data field,
 wherein the second PPDU includes a second EDMG-Header field and a second data field,
 wherein, based on the minimum number of symbol blocks of the first PPDU, zero padding is inserted in the first data field,
 wherein the A-PPDU is transmitted through a 2.16 GHz channel or 2.16+2.16 GHZ channel, and
 wherein the transmitting STA and the receiving STA support one space-time stream.

6. The method of claim 5, wherein a number of symbol blocks in the first data field having zero padding inserted therein is configured to be equal to the minimum number of symbol blocks of the first PPDU.

7. The method of claim 6, wherein, when the A-PPDU is transmitted in an EDMG Single Carrier (SC) mode, a symbol block of the first data field is an SC symbol block, and
 wherein a minimum number of symbol blocks of the first PPDU is configured based on an EDMG_FIRST_PPDU_MIN_SC_BLOCKS value of a TXVECTOR parameter.

8. The method of claim 7, wherein, when the A-PPDU is transmitted in an EDMG Orthogonal Frequency Division Multiplexing (OFDM) mode, a symbol block of the first data field is an OFDM symbol block,
 wherein the minimum number of symbol blocks of the first PPDU is configured based on first to fourth values,
 wherein the first value is a value of the EDMG_FIRST_PPDU_MIN_SC_BLOCKS,
 wherein the second value is an SC Inverse Discrete Fourier Transform/Discrete Fourier Transform (IDFT/DFT) period,
 wherein the third value is an OFDM IDFT/DFT period, and
 wherein the fourth value is a guard interval (GI) duration of the first and second PPDUs.

9. The method of claim 7, wherein a value of the EDMG_FIRST_PPDU_MIN_SC_BLOCKS is negotiated based on EDMG Capabilities elements, or determined as a fixed value, or configured as an EDMG_BRP_MIN_SC_BLOCKS value of the TXVECTOR parameter.

10. The method of claim 5, wherein a GI is inserted at both ends of the first and second data fields,
 wherein the L-Header field includes information on a length of the first PPDU,
 wherein the first EDMG Header field includes information on a type of the GI,
 wherein the GI type includes a short GI, a normal GI, and a long GI,
 wherein the short GI is generated based on a golay sequence having a length of 32,
 wherein the normal GI is generated based on a golay sequence having a length of 64, and
 wherein the long GI is generated based on a golay sequence having a length of 128.

11. The method of claim 5, further comprising:
 performing, by the receiving STA, Frequency Domain Equalizer (FDE) per duration for the A-PPDU,
 wherein the duration is determined based on an FFT window size, and
 wherein a cyclic property of the second EDMG-Header field is satisfied based on the first data field having zero padding inserted therein.

* * * * *